(12) United States Patent
Pulsifer

(10) Patent No.: US 7,586,653 B2
(45) Date of Patent: Sep. 8, 2009

(54) METHOD AND SYSTEM FOR ENHANCING AN IMAGE USING LUMINANCE SCALING

(75) Inventor: Dean Andrew Pulsifer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 782 days.

(21) Appl. No.: 11/112,080

(22) Filed: Apr. 22, 2005

(65) Prior Publication Data

US 2006/0239550 A1    Oct. 26, 2006

(51) Int. Cl.
  *H04N 1/40*  (2006.01)
(52) U.S. Cl. .................. 358/461; 358/401; 382/167; 382/168; 382/169; 382/172
(58) Field of Classification Search ......... 358/2.99, 358/401, 461; 382/167, 168, 172, 169, 274
  See application file for complete search history.

(56) References Cited

U.S. PATENT DOCUMENTS

| | | | |
|---|---|---|---|
| 5,410,617 A * | 4/1995 | Kidd et al. ............ | 382/169 |
| 5,751,846 A | 5/1998 | Higgins-Luthman et al. | |
| 5,774,578 A | 6/1998 | Shimizu | |
| 5,778,092 A * | 7/1998 | MacLeod et al. ........ | 382/176 |
| 5,999,646 A | 12/1999 | Tamagaki | |
| 6,043,900 A | 3/2000 | Feng et al. | |
| 6,236,751 B1 * | 5/2001 | Farrell ................ | 382/168 |
| 6,351,558 B1 | 2/2002 | Kuwata | |
| 6,393,148 B1 | 5/2002 | Bhaskar | |
| 6,463,173 B1 * | 10/2002 | Tretter ............... | 382/168 |
| 6,580,825 B2 | 6/2003 | Bhaskar | |
| 6,621,595 B1 | 9/2003 | Fan et al. | |
| 6,661,917 B1 | 12/2003 | Nagakubo et al. | |
| 6,700,684 B1 | 3/2004 | Chiba et al. | |
| 6,771,815 B2 | 8/2004 | Yang et al. | |
| 6,992,791 B2 * | 1/2006 | Walmsley et al. ....... | 358/1.18 |

OTHER PUBLICATIONS

R. Ratcliff et al, Perception & Psychophysics, May 1, 2003, Psychonomic Society Publications, vol. 65, pp. 523-535.*

* cited by examiner

*Primary Examiner*—King Y Poon
*Assistant Examiner*—Jamares Washington
(74) *Attorney, Agent, or Firm*—Taylor And Aust PC

(57) ABSTRACT

A method for enhancing an image includes generating a luminance histogram for the image; generating a derivative histogram by taking a first derivative of the luminance histogram; searching for a plurality of black peaks and searching for a plurality of white peaks using the derivative histogram; and performing luminance scaling of the image between one black peak of the plurality of black peaks and one white peak of the plurality of white peaks.

29 Claims, 16 Drawing Sheets

METHOD AND SYSTEM FOR ENHANCING AN IMAGE USING LUMINANCE SCALING

BACKGROUND OF THE INVENTION

1. Field of the Invention

The present invention relates to imaging, and, more particularly, to a method and system for enhancing an image.

2. Description of the Related Art

Many standard image-processing techniques have been developed to enhance image data. The original images may be, for example, digital photographs, scanned data, or documents created on a computer. The primary techniques used are contrast stretching, Tone Response Curves (TRC) and spatial filters. Other techniques, such as unsharp masking, erosion and dilation, can also be used. Each of these techniques has parameters that control how image data is affected. Different types of images require different parameter values in order to achieve optimal improvement.

Contrast stretching is a technique which generally uses a piecewise linear transformation to convert the input data to adjusted output values. The adjustments are typically separated into regions, for example, three regions, such as a dark region, a mid-tone region, and light region. Parameters for each region include the range of input values for the particular region, as well as parameters specific to the transfer function used for the particular region. The input values are transformed according to the definitions for each region. Another way to parameterize the function would be to specify the transition points.

Tone response curves (TRC) refer to implementing a more complicated transform of the image data. A look up table is generally used to implement TRCs. A curve that has the desired shape is digitized and stored in a Look Up Table (LUT). The input data is transformed by looking up the appropriate value in the LUT. The LUT may have an entry for each input value, or it may be a sparse LUT that stores a subset of the values, and uses interpolation to approximate the intermediate values. A LUT can be used to implement a power curve, a polynomial expression, an arbitrary curve or even contrast stretching.

Spatial filters use information about neighboring pixels to modify pixel values. Median filters, sharpening filters and linear spatial filters (convolution kernel) are examples of spatial filters. The median filter is an order-statistic filter which sorts the values of the pixel and its neighbors and uses the median value as output. A convolution kernel uses a mask, which applies weights to the pixel and its neighbors and adds them together. The resultant value is used as the output. A parameter for a median filter includes the size of the neighborhood to use. Parameters for a convolution kernel include the size of the mask and the values contained in the mask (weights).

SUMMARY OF THE INVENTION

The invention, in one exemplary embodiment, relates to a method for enhancing an image. The method includes generating a luminance histogram for the image; generating a derivative histogram by taking a first derivative of the luminance histogram; searching for a plurality of black peaks and searching for a plurality of white peaks using the derivative histogram; and performing luminance scaling of the image between one black peak of the plurality of black peaks and one white peak of the plurality of white peaks.

The invention, in another exemplary embodiment, relates to an imaging apparatus configured for enhancing an image for printing. The imaging apparatus includes a print engine configured to mount a cartridge, and a controller communicatively coupled to the print engine. The controller is configured to execute instructions for generating a luminance histogram for the image; generating a derivative histogram by taking a first derivative of the luminance histogram; searching for a plurality of black peaks and searching for a plurality of white peaks using the derivative histogram; and performing luminance scaling of the image between one black peak of the plurality of black peaks and one white peak of the plurality of white peaks.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
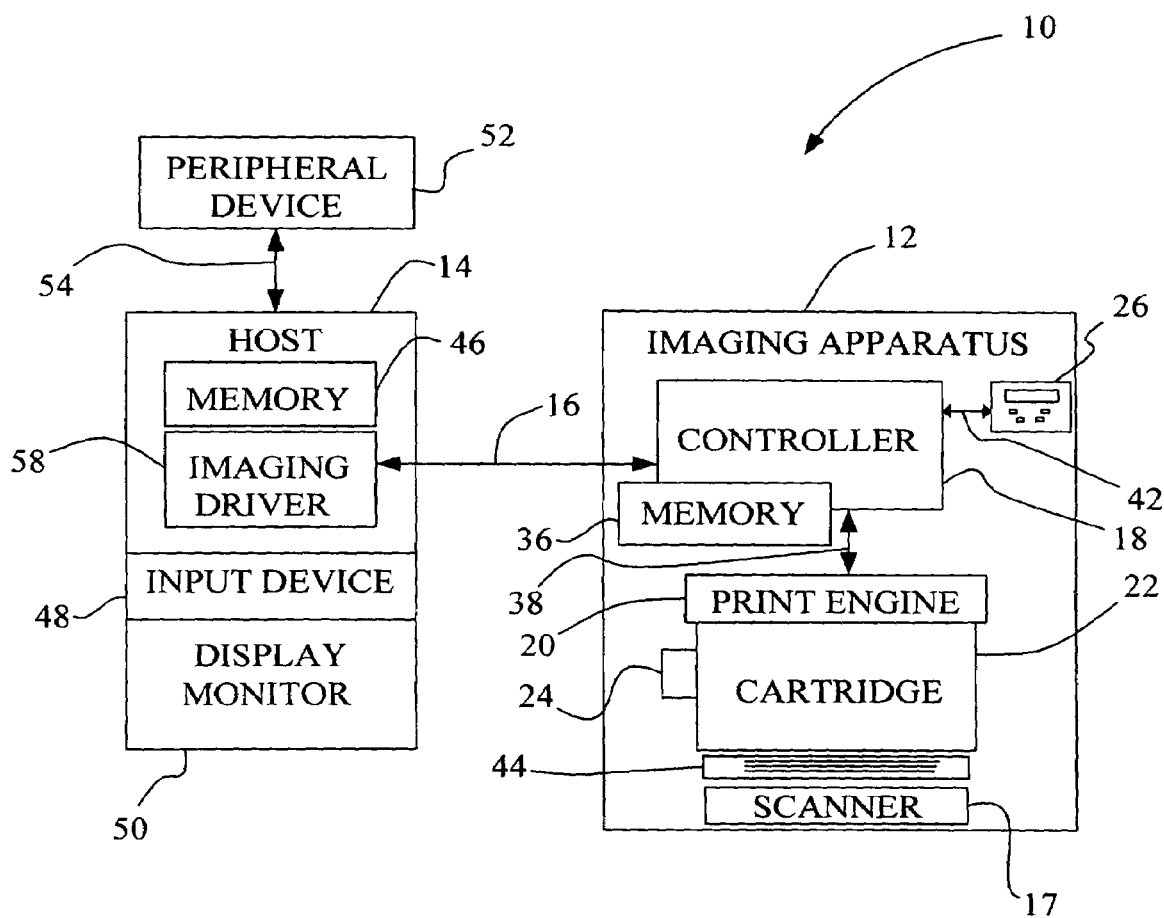
FIG. 1 is a diagrammatic depiction of an imaging system in accordance with an embodiment of the present invention.

Referring now to the drawings, and particularly to FIG. 1, there is shown a diagrammatic depiction of an imaging system 10 in accordance with an embodiment of the present invention. Imaging system 10 includes an imaging apparatus 12 and a host 14. Imaging apparatus 12 communicates with host 14 via a communications link 16.

Imaging apparatus 12 can be, for example, an ink jet printer and/or copier, an electrophotographic (EP) printer and/or copier, or an all-in-one (AIO) unit that includes a printer, a scanner 17, and possibly a fax unit. Imaging apparatus 12 includes a controller 18, a print engine 20, a replaceable cartridge 22 having cartridge memory 24, and a user interface 26.

Controller 18 is communicatively coupled to print engine 20, and print engine 20 is configured to mount cartridge 22. Controller 18 includes a processor unit and associated memory 36, and may be formed as one or more Application Specific Integrated Circuits (ASIC). Controller 18 may be a printer controller, a scanner controller, or may be a combined printer and scanner controller, for example, such as for use in a copier. Although controller 18 is depicted as residing in imaging apparatus 12, alternatively, it is contemplated that all or a portion of controller 18 may reside in host 14. Nonetheless, as used herein, controller 18 is considered to be a part of imaging apparatus 12. Controller 18 communicates with print engine 20 and cartridge 22 via a communications link 38, and with user interface 26 via a communications link 42. Controller 18 serves to process print data, to operate print engine 20 during printing, and to execute instructions to detect whether a cartridge 22 installed in imaging apparatus 12 is counterfeit.

In the context of the examples for imaging apparatus 12 given above, print engine 20 can be, for example, an ink jet print engine or an electrophotographic print engine, configured for forming an image on a substrate 44, which may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. As an ink jet print engine, print engine 20 operates cartridge 22 to eject ink droplets onto substrate 44 in order to reproduce text or images, etc. As an electrophotographic print engine, print engine 20 causes cartridge 22 to deposit toner onto substrate 44, which is then fused to substrate 44 by a fuser (not shown). In the embodiment depicted, imaging apparatus 12 is an ink jet unit.

Host 14 may be, for example, a personal computer, including memory 46, an input device 48, such as a keyboard, and a display monitor 50. One or more of a peripheral device 52, such as a digital camera, may be coupled to host 14 via communication links, such as communication link 54. Host 14 further includes a processor, and input/output (I/O) interfaces. Memory 46 can be any or all of RAM, ROM, NVRAM, or any available type of computer memory, and may include one or more of a mass data storage device, such as a floppy drive, a hard drive, a CD drive and/or a DVD drive. As set forth above, memory 36 of imaging apparatus 12 stores data pertaining to each particular cartridge 22 that has been installed in imaging apparatus 12. However, it is alternatively contemplated that memory 46 of host 14 may store such data.

During operation, host 14 includes in its memory 46 a software program including program instructions that function as an imaging driver 58, e.g., printer/scanner driver software, for imaging apparatus 12. Imaging driver 58 is in communication with controller 18 of imaging apparatus 12 via communications link 16. Imaging driver 58 facilitates communication between imaging apparatus 12 and host 14, and provides formatted print data to imaging apparatus 12, and more particularly, to print engine 20. Although imaging driver 58 is disclosed as residing in memory 46 of host 14, it is contemplated that, alternatively, all or a portion of imaging driver 58 may be located in controller 18 of imaging apparatus 12.

In accordance with an embodiment of the present invention, an image may be enhanced, for example, brightness and contrast enhancement, using program instructions executing in controller 18 and/or as part of imaging driver 58. The present description of embodiments applies equally to image enhancement operations executing in controller 18 or as part of imaging driver 58, and any reference herein to instructions being executed by controller 18 is intended as an expedient in describing the present invention, and is to be construed as instructions being executed by controller 18 and/or instructions executed as part of imaging driver 58 for performing image enhancement in accordance with the present invention.

Figure 2:
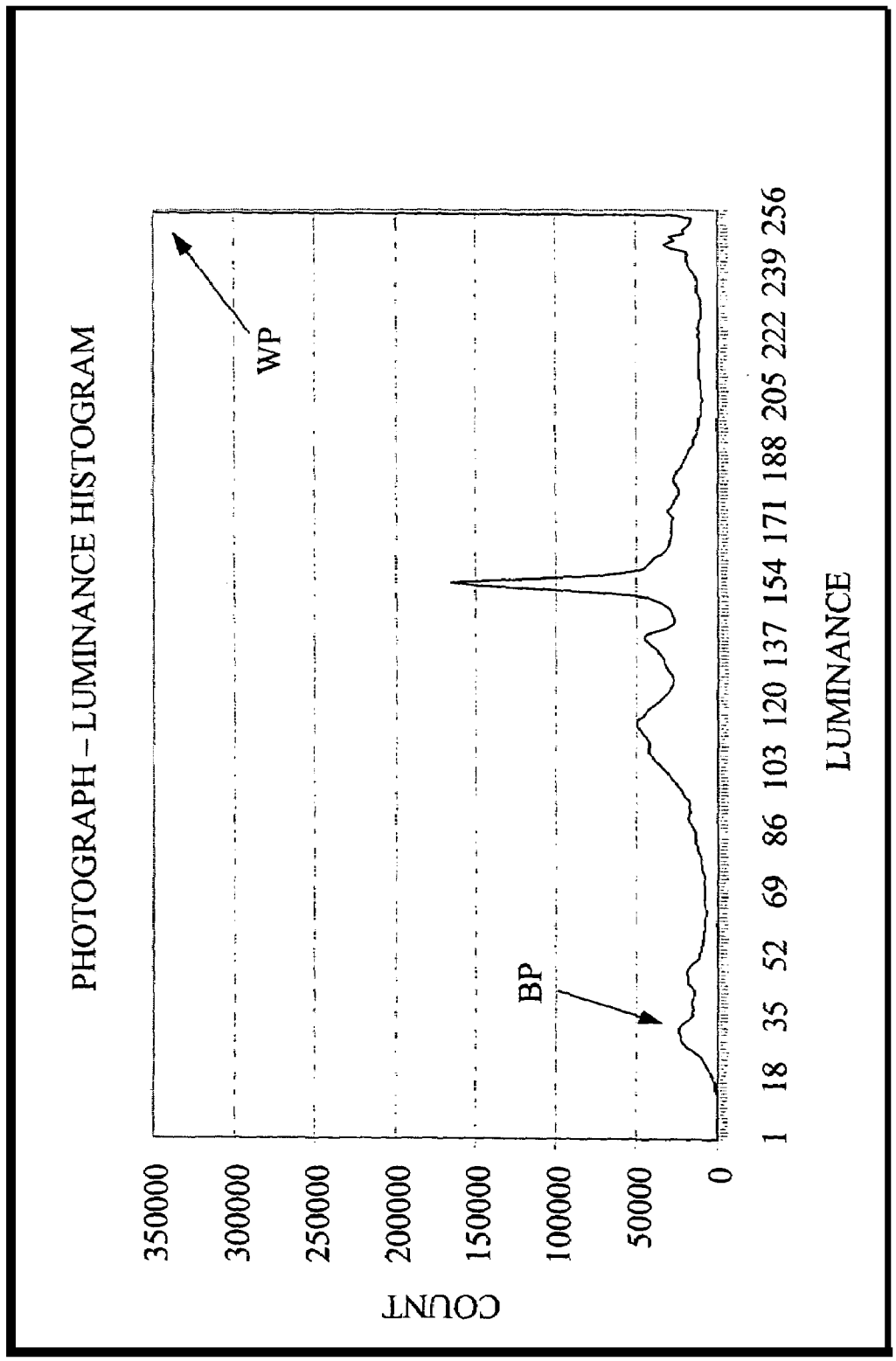
FIG. 2 is a luminance histogram of a first image used in describing image enhancement in accordance with an embodiment of the present invention.
Figure 3:
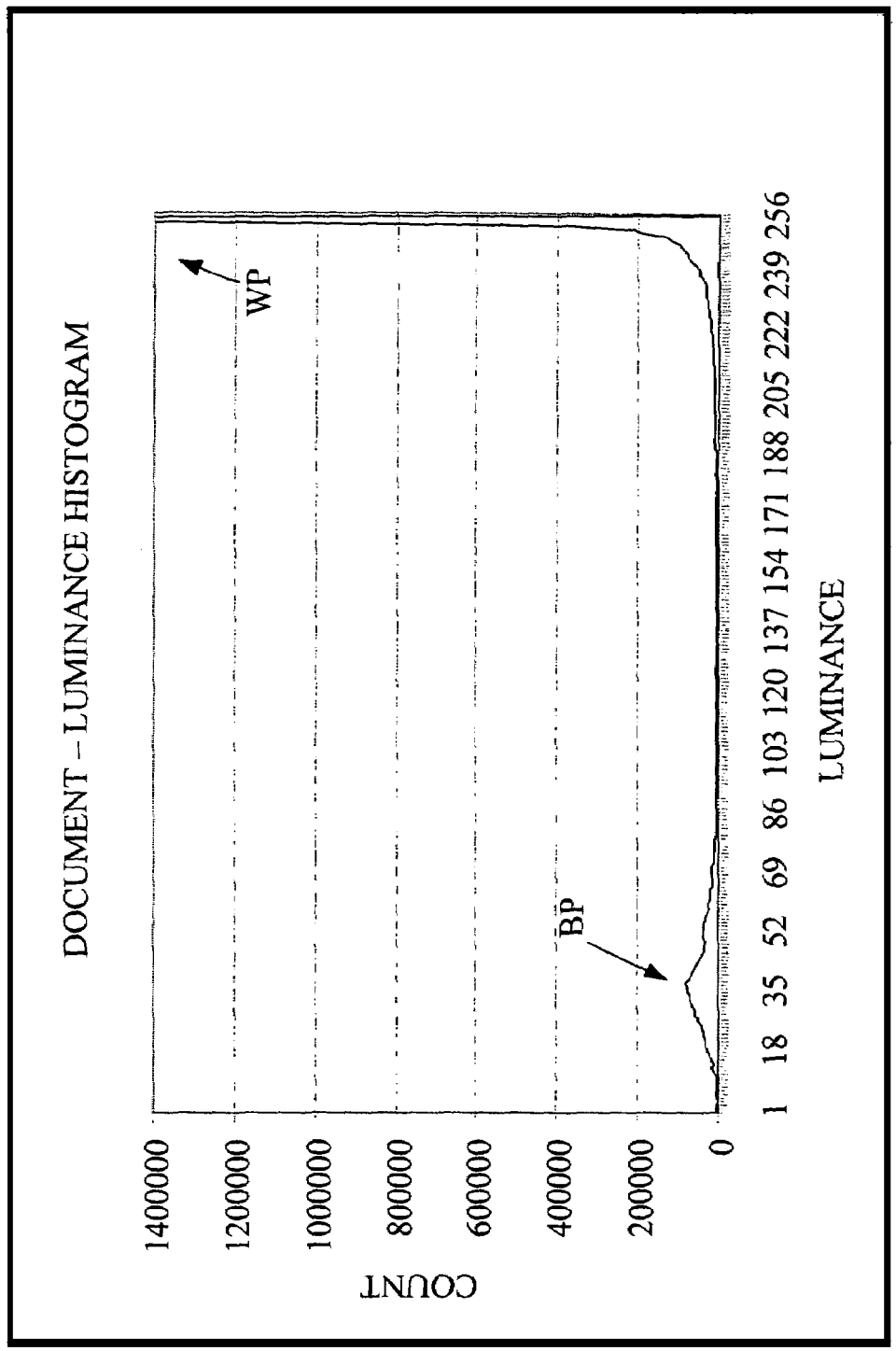
FIG. 3 is a luminance histogram of a second image used in describing image enhancement in accordance with an embodiment of the present invention.

Referring now to FIGS. 2 and 3, two luminance histograms for two different types of images are depicted. The first image (represented by the luminance histogram FIG. 2), is a typical photograph. The second image (represented by the luminance histogram of FIG. 3) is a typical document. The photograph histogram has peaks and valleys, but has a lot of information in the midtones, which is the horizontally middle portion of the histogram, and does not have much information at the higher luminances. The photograph histogram also does not contain very much information in the very dark luminances, i.e., luminance values approaching zero. The photograph might be improved by stretching the luminances that contain data to the lightest and darkest values of the histogram, resulting in a more saturated and dynamic output image that would typically be perceived as a better image than the original.

The document histogram has very different characteristics from the first, such as a very large peak at the paper luminance and much smaller peaks at the luminances of the writing on the page, and has a very limited range of the potential luminances. The document may also be enhanced by stretching the luminances, which would enhance the brightness and contrast of the image.

In performing image enhancement in accordance with the present invention, the image is characterized by computing and analyzing a histogram of the image. The histogram is calculated by analyzing the image data and counting how many times each value shows up in the image. The values being analyzed could be luminance, red, green, blue, or any other measurable characteristic of the image. In the present embodiment, a luminance histogram is employed. The histogram provides a condensed summary of the image that provides many insights into its characteristics.

Using the histogram, peaks associated with darker colors may be found, and peaks associated with lighter colors may be found. The image is then enhanced by "stretching," or scaling the values, e.g., luminance, between the peaks. In performing such image enhancement a significant aspect is determining where to start stretching from and how far to stretch so as to optimally enhance the image.

Most images have a peak near the white and black points in the image, which are lightest and darkest portions of the image, generally. The goal of image enhancement is to find those peaks and stretch them to the black and white points on the luminance scale. For text copies, stretching is normally performed between absolute black and absolute white, as this is what the typical user desires. For images, stretching between absolute black and absolute white is not typically performed, because not all images have pure black and white, and because such stretching can introduce too much contrast.

The determination of text versus image can be implemented by comparing the amount of data in the mid tones with the data near the black and white peaks. The previous histograms of FIGS. 2 and 3 illustrate this. The photograph (FIG. 2 histogram) has a lot of data in the midtones, whereas document (FIG. 3 histogram) does not. It is also possible to apply a brightness or contrast adjustment to the data as part of the stretch. Increasing the contrast is especially useful for text copies since just stretching does not always provide the output that the user expects (e.g. black text and white background).

Figure 4:
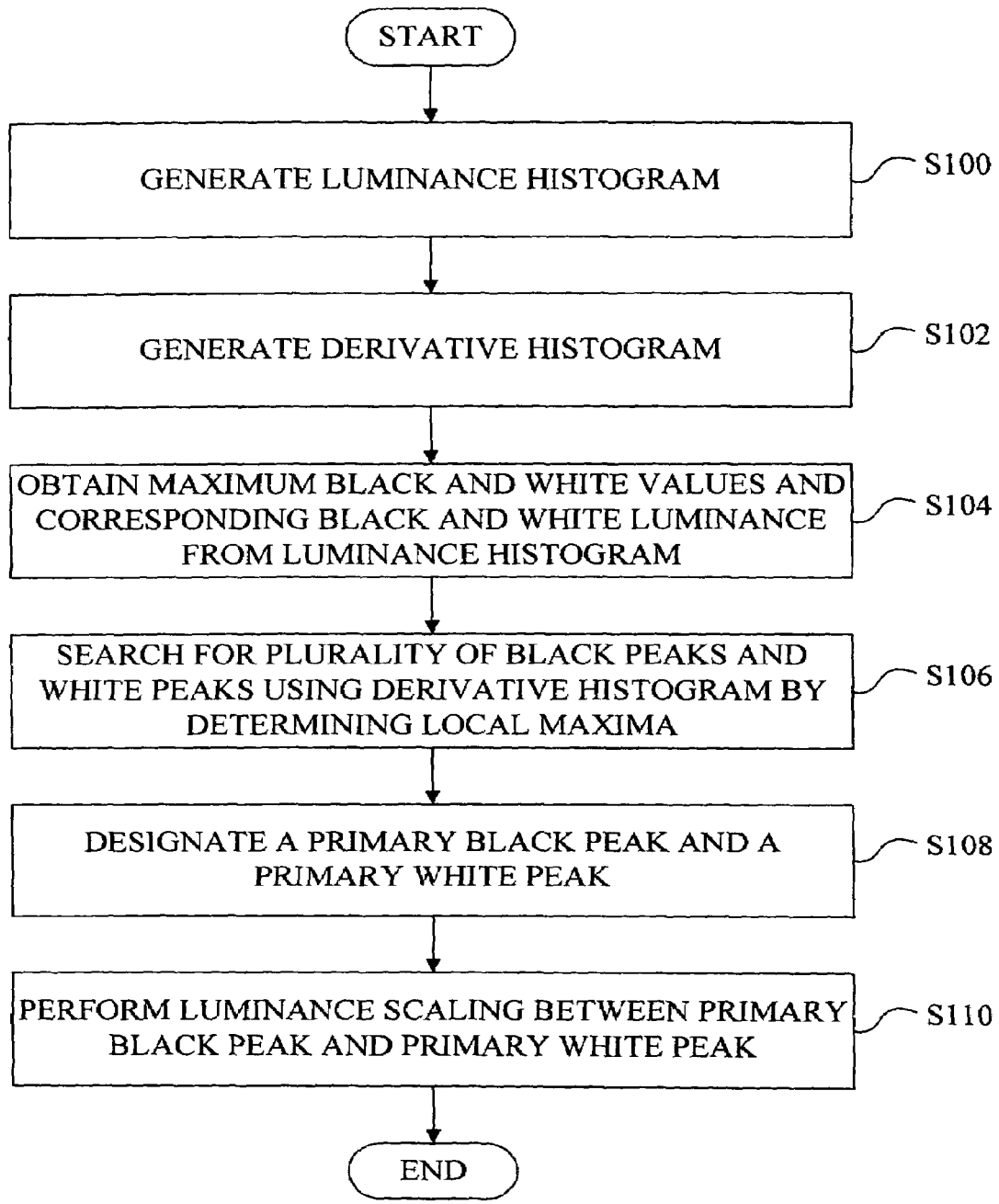
FIG. 4 is flowchart depicting a method of enhancing an image in accordance with an embodiment of the present invention.

Referring now to FIG. 4, a method for enhancing an image in accordance with an embodiment of the present invention is depicted in the form of a flowchart, with respect to steps S100-S110. The image is one obtained from any convenient source, e.g., obtained as a computer file from a computer, a digital camera, such as peripheral device 52, etc., a scanned image file obtained by scanning a printed or otherwise developed image using scanner 17, or an image or document created on a computer in a conventional manner. During normal operation of imaging apparatus 12, controller 18 executes instructions to perform image enhancement in accordance with an embodiment of the present invention by executing program instructions to carryout the processes set forth in the below description.

In describing the present embodiment, various predefined and/or specified percentages are used as control values and/or other parameters for use in algorithms that are executed in performing image enhancement in accordance with the present invention. Such values are typically generated in the normal course of practicing the present invention, and may be based on empirical data. Any reference to specific values are not intended to limit the invention in any manner. These values are readily determined in the normal course of practicing the present invention, and may also be dependent upon, for example, the design and/or performance of various specific components of imaging apparatus 12 or the image, and/or any preferences of the manufacturer of imaging apparatus 12, e.g., based on user input or other known user predilections.

In describing the present embodiment, exemplary pseudo-code is provided to illustrate selected details. The below tables identify and define the variables used in the pseudo-code set forth in the description of the present embodiment. The pseudo-code set forth below in describing the present embodiment is exemplary in nature, and does not limit the present invention in any manner.

| Control Value or Variable | Description | Exemplary Values |
|---|---|---|
| Somewhat_Darker | Input values for brightness algorithm to control degree of adjustment. | Enumerant |
| Somewhat_Brighter | Input values for brightness algorithm to control degree of adjustment. | Enumerant |
| Much_Darker | Input values for brightness algorithm to control degree of adjustment. | Enumerant |
| Much_Brighter | Input values for brightness algorithm to control degree of adjustment. | Enumerant |
| AverageMidTone | The Average histogram value for the mid-tones (between peaks). | Determined |
| Between Peaks Count | The sum of histogram values between the black and white peaks. | Determined |
| Between Peaks Width | The number of histogram positions between the black and white peaks. | Determined |
| BlackDownCount1 | The number of negative derivative values (down the peak) needed to indicate the first black peak. | 3 |
| BlackDownCount2 | The number of negative derivative values (down the peak) needed to indicate the second black peak. | 6 |
| BlackMidtonePercent | If the input image is determined to be a photograph, and if the blackPeak value is greater than BlackMidtonePercent of the average middle tone value, then re-compare the peaks. | 3% |
| BlackPeak | The selected primary black peak. | Determined |
| BlackPeakPercent | If re-comparing the peaks, and if the first black peak is greater than BlackPeakPercent of the second black peak, then use the first black peak. | 4% |
| BlackPeakPercentage | If the first peak is less than this percentage of the second peak, then use the second peak. Otherwise use the first peak. | 25% |
| BlackThreshold2Percent | Threshold compensation for the black threshold for the $2^{nd}$ tier of brightness or contrast adjustment. | 80% |
| BlackWhiteRatio | The minimum ratio between totalBlack and totalWhite necessary to require brightness or contrast adjustment. | 14% |
| BrightnessAdjustment | A value to control the strength of the brightness correction. | Determined |
| Deriv(i) | Derivative value at the $i^{th}$ luminance position on the derivative histogram. | Determined |
| Derive | Derivative of histogram consequence. | Determined |
| DesiredBlack | The value to stretch the primary black to. | Determined |
| DesiredBlackDocument | The desired black level for documents. | Determined |
| DesiredBlackPhoto | The desired black level for photographs. | Determined |

-continued

| Control Value or Variable | Description | Exemplary Values |
|---|---|---|
| DesiredBlackValue | The desired output value for the black peak. | Variable |
| DesiredWhiteDocument | The desired white level for documents. | Determined |
| DesiredWhitePhoto | The desired white level for photographs. | Determined |
| DesiredWhiteValue | The desired output value for the white peak. | Variable |
| Downcount | Negative derivative count; number of negative derivative values accumulated after passing a zero derivative point. | Determined |
| Downcount | The number of negative derivative values found. | Determined |
| FirstBlackPeak | The position of the first black peak (e.g., proximal). | Determined |
| FirstWhitePeak | The position of the first white peak (e.g., proximal). | |
| Hist | Histogram. | Determined |
| Hist(i) | Histogram count value at the $i^{th}$ luminance position on the histogram. | Determined |
| InputValue | Input luminance for performing luminance scaling. | Determined |
| LeftOver | Count of values that are neither black nor white. Leftover = TotalImage (totalBlack + totalWhite). | Determined |
| MaxBlackPercent | The percentage of the maximum black value below which it is assumed that the peak has been passed. | 10% |
| MaxBlackPos | Luminance position of maximal black value. | Determined |
| MaxBlackValue | The longest histogram value found in this histogram between the maximal black (0) and MaxBlackWidth. | Determined |
| MaxBlackWidth | The largest distance along the luminance scale that is used to look for a black peak. | 55 on a scale of 0-255 for 8 bit representation |
| MaxWhitePercent | The percentage of the maximum white value below which it is assumed that the peak has been passed. | 10% |
| MaxWhiteWidth | The largest distance along the luminance scale that is used to look for a white peak. | 55 |
| OutputValue | The luminance scaled data to return from the ScaleData function. | Determined |
| PeakBlack | The histogram value of the primary black peak. | Determined |
| PeakBlack1 | Histogram value of first found black peak. | Determined |
| PeakBlack1Position | Luminance position of first found black peak. | Determined |
| PeakBlackPosition | Luminance position of primary black peak. | Determined |
| Photograph | Is this a photograph (True) or a text document (False)? | Determined |
| PhotoPercent | If the between peaks count relative to the total image count is greater than PhotoPercent, then the image is considered a photograph. | 38% |
| SecondBlackPeak | The luminance position of the second black peak (e.g., distal). | Determined |
| SecondWhitePeak | The luminance position of the second white peak (e.g., distal). | Determined |
| Total Image | The total number of positions in the image. The sum of all histogram values. | Determined |
| TotalBlack | The sum of histogram value from maximal black (0) to MaxBlackWidth. The count of values in black range. | Determined |
| TotalWhite | The sum of histogram values from maximal white (255) to MaxWhiteWidth. The count of values in the white range. | Determined |
| WhiteDownCount1 | The number of negative derivative values (down the peak) needed to indicate the first white peak. | 3 |
| WhiteDownCount2 | The number of negative derivative values (down the peak) needed to indicate the second white peak. | 6 |

-continued

| Control Value or Variable | Description | Exemplary Values |
|---|---|---|
| WhiteMidtonePercent | If the input image is determined to be a photograph, and if the whitePeak value is greater than WhiteMidtonePercent of the average middle tone value, then re-compare the peaks. | 3% |
| WhitePeak | The selected primary white peak. | Determined |
| WhitePeakPercent | If re-comparing the peaks, and if the first white peak is greater than WhitePeakPercent of the second white peak, then use the first white peak. | 4% |
| WhitePeakPercentage | If the first peak is less than this percentage of the second peak, then use the second peak. Otherwise use the first peak. | 25% |
| WhiteThreshold2Percent | Threshold compensation for the white threshold for the $2^{nd}$ tier of brightness or contrast adjustment. | 80% |

At step S100, a luminance histogram is generated from the image that is to be enhanced. If the original image data does not have a luminance channel, then a luminance value is calculated for each position in the image. As set forth above, FIGS. 2 and 3 represent luminance histograms for two different types of images, wherein the first image (FIG. 2) represents a typical photograph, and the second image (FIG. 3) represents a typical document.

At step S102, the first derivative of the luminance histogram is taken to generate a derivative histogram. The first derivative may be taken, for example, by fitting a curve to the luminance histogram, and taking the first derivative of the curve. In the present embodiment, the first derivative is taken using difference equations. For example, the value for the derivative at location 0 is the value of the histogram at location 0 minus the value of the histogram at location 1. The value for the derivative at location 1 is the value of the histogram at location 1 minus the value of the histogram at location 2. This process continues until the middle luminance value on the abscissa of the luminance histogram is reached. The abscissa of the luminance histogram is a luminance scale. The same process is then repeated starting at the maximum luminance value on the luminance scale, and working towards the middle luminance value.

Figure 5:
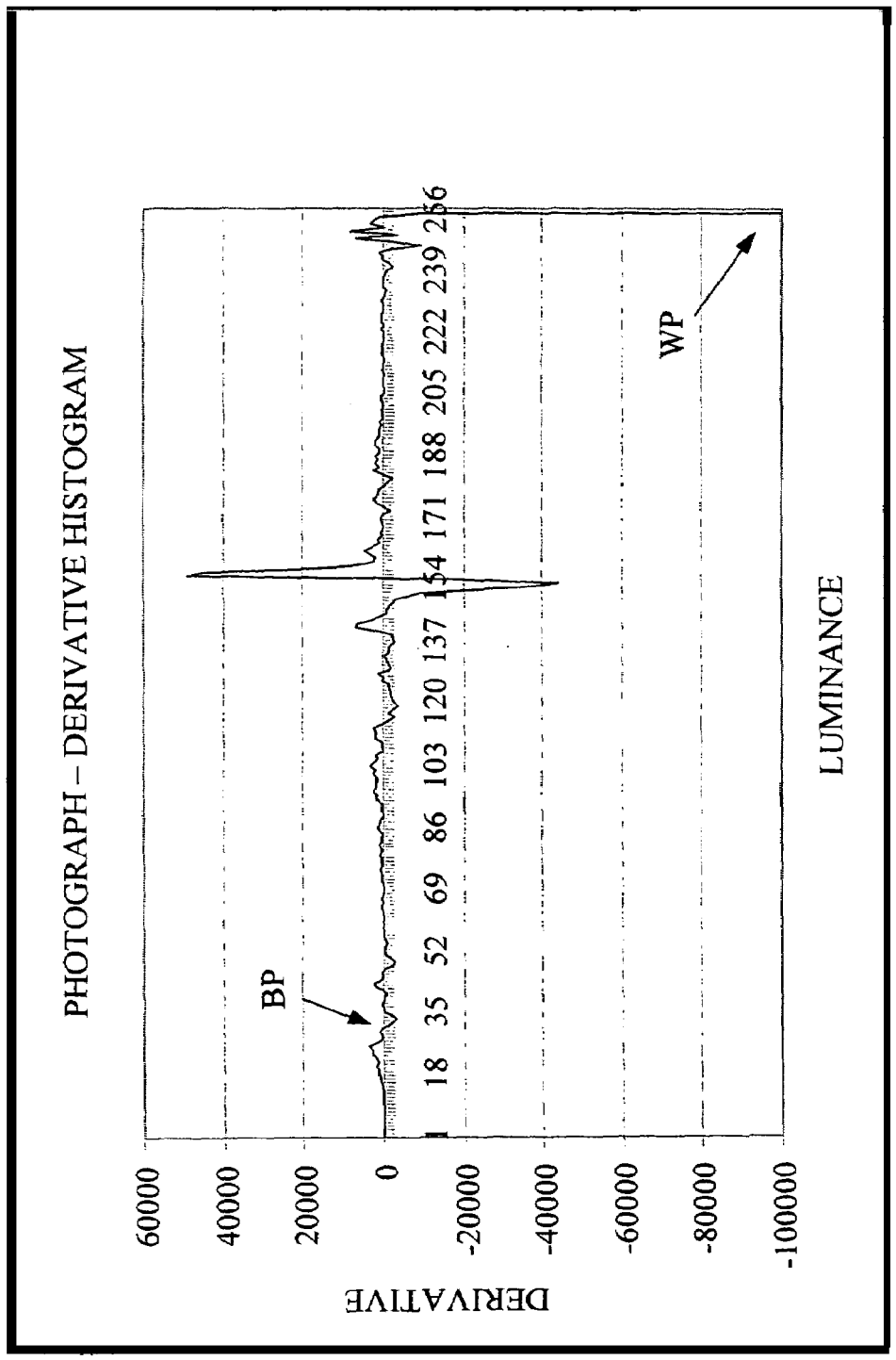
FIG. 5 is a derivative histogram of the first image generated and used in accordance with an embodiment of the present invention.
Figure 6:
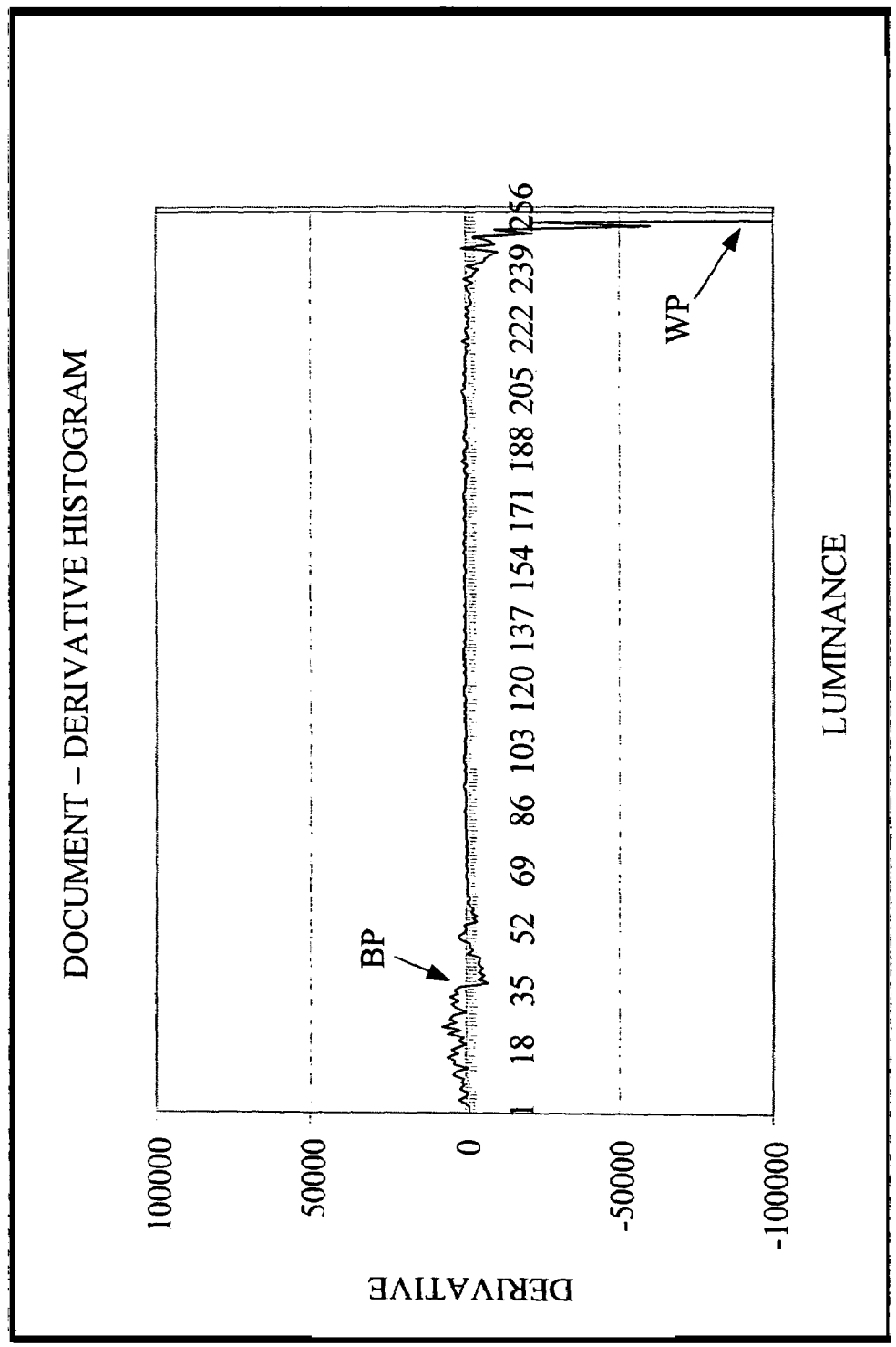
FIG. 6 is a derivative histogram of the second image generated and used in accordance with an embodiment of the present invention.

Referring now to FIGS. 5 and 6, derivative histograms for the luminance histograms of FIGS. 2 and 3, respectively, are depicted.

The below pseudo-code describes an exemplary process for generating the derivative histogram.

```
for (i=0; i<128; i++)
{
    deriv[i]=hist[i+1]-hist[i];
}
for (i=0; i<128; i++)
{
    deriv[255-i]=hist[255-i-1]-hist[255-i];
}
```

At step S104, a maximum black value and a maximum white value are obtained from luminance histogram, e.g., in the form of count values representing the highest value on the left and right side, respectively, of the histogram. Although the terms, "black" and "white" are used herein, such terms are not intended to represent extreme count values of 0 and 255 on the luminance scale, for example, for 8-bit color designation, but rather, "black" is intended to represent luminance values on the "black," or left side of the luminance scale, e.g., values from 0 to about 127, and "white" is intended to represent luminance values on the "white," or right side of the luminance scale, e.g., values from 255 down to about 128 on the luminance scale. Hence, the "maximum black value" pertains to, for example, the maximum histogram count on the left side of the luminance histogram, whereas the "maximum white value" pertains to, for example, the maximum histogram count on the right side of the luminance histogram. The luminance values corresponding to each of the maximum black value and maximum white value are also obtained, e.g., the black luminance associated with the maximum black value and the white luminance associated with the maximum white value, along with the respective luminance scale positions.

At step S106, the derivative histogram is traversed to search for the black and white peaks in the histogram. Generally, there is more than one white peak and more than one black peak, and hence, searching for a plurality of black peaks and searching for a plurality of white peaks using the derivative histogram is performed. Searching for the plurality of black peaks and searching for the plurality of white peaks includes starting at either the minimum or maximum end of the derivative histogram, for black peaks or for white peaks, respectively, and searching to determine a plurality of local maxima based on a zero first derivative value, using the derivative histogram. In the present embodiment, this includes looking for consecutive negative values after a zero derivative point, for example, as indicated by a positive to negative transition, which indicates a peak has been found. When the derivative is positive, the peak is being "ascended" in traversing the derivative histogram, whereas when the derivative is negative, the peak is being "descended" in traversing the derivative histogram.

When searching for black peaks, the search is performed in the direction of increasing luminance, and thus, a succession of negative values obtained after a zero derivative point are indicative that a black peak has been found. In the present embodiment, the right side of the derivative histogram is inverted prior to searching for the plurality of white peaks, and the searching is performed in the direction of decreasing luminance. Hence, when traversing the derivative histogram in such a direction during the search, a succession of negative values obtained after a zero derivative point is indicative that a white peak has been found.

Accordingly, searching for the plurality of black and white peaks in conjunction with the present invention includes incrementing a negative derivative count (a.k.a down count) when searching the derivative histogram, wherein each of the plurality of local maxima is determined based on comparing the negative derivative count to a negative increment control value. Generally, the negative derivative count represents a consecutive number of negative derivative values along the derivative histogram from the local maxima.

The present invention employs a control value which indicates how many consecutive negative values will indicate a peak. The control value may be different for the minimum or maximum search, and may be different for searching for black peaks than for searching for white peaks. When the control value is reached, the control value is subtracted from the current position in the histogram to go back to the peak. The algorithm has a maximum distance that it will look for the peak to safeguard the analysis. If the maximum distance is reached a peak is assumed for that location. This is because a very balanced image may not have a significant peak to find, so a limit is needed to stop the algorithm.

Many images have a small or false peak in the luminance histogram. The algorithm continues its search for a second peak using a new control value for the number of consecutive negative values to find. The locations for both peaks are saved for later use. A total of up to 4 peak locations are stored in the present embodiment, although it will be understood that any number of peaks may be stored without departing from the scope of the present invention. If the maximum distance is reached, then that status is saved also.

The below pseudo-code describes an exemplary process for searching for the plurality of black peaks and searching for the plurality of white peaks using the derivative histogram.

```
downCount=0;
for (i=0; i<MaxBlackWidth; i++)
{
    if(deriv[i]<0)downcount++else downcount=0;
    if (downCount>= BlackDownCount1)
    {
        firstBlackPeak = i–BlackDownCount1;
        if(firstBlackPeak<0)then
firstBlackPeak=0;
        break;
    }
}
downCount=0;
for(i=firstBlackPeak+BlackDownCount1;
i<MaxBlackWidth; i++)
{if (deriv[i]<0) downcount++ else downcount=0;
    if (downCount>= BlackDownCount2)
    {secondBlackPeak = i–BlackDownCount2;
        if(secondBlackPeak<0)then
secondBlackPeak=0;
        break;
    }
}
```

Similar code is used to detect the white peaks. The starting point will be 255 and the index will move towards the middle of the derivative histogram.

Experience has shown that certain images don't have a well-defined peak. Sometimes the histogram slope is very noisy and the down count required to designate a valid peak is not reach due to occasional positive derivatives, e.g., resulting from noise or image artifacts. Thus, the black and white regions are searched (e.g., based on the MaxBlackWidth and MaxWhiteWidth control values) to find the maximum black and white histogram values. These values are saved in memory, along with their respective positions on the histogram. In addition, the total amount of the black and white areas of the histogram is calculated.

While trying to find the peaks, an additional condition is added to allow incrementing the negative derivative count (down count). If the current position is past the maximum value position and the current histogram value is less than a specified percentage of the maximum histogram black or white value, then the down count, e.g., the negative derivative count, is incremented. The specified percentage is another control value for the algorithm, and may be a different value for black peaks than for white peaks, and is applied to first, second, and subsequent peaks, black or white, that were found.

For example,

```
if((deriv[i]<0)||((i>maxBlackPos)&&
(hist[i]<(maxBlackValue*MaxBlackPercent)) then
    { downCount++;}
else
    { downCount=0;}
```

Step S106 is described below in greater detail with respect to FIGS. 9A-9D and steps S106-1 to S106-37.

At step S108, a primary black peak from the plurality of black peaks is designated, and a primary white peak from the plurality of white peaks is designated. For example, after the search through the derivative histogram, the number and location of the peaks is known, and the primary black peak and primary white peak are designated as those peaks between which stretching, or luminance scaling, will be performed. As part of the stretching, the peaks are moved to the corresponding extremes of the luminance scale. Generally, an image will have more than one black peak and more than one white peak, and the designation of the primary black peak and the primary white peak may not be straightforward.

Referring again to FIGS. 2, 3, 5, and 6, the designated primary black peak and primary white peak are indicated in the luminance histograms of FIGS. 2 and 3, and in the corresponding derivative histograms of FIGS. 5 and 6 as "BP" and "WP," respectively.

The below pseudo-code describes an exemplary process for designating the primary black peak and designating the primary white peak.

```
if(hist[firstBlackPeak]>
hist[secondBlackPeak]*BlackPeakPercentage)
    blackPeak=firstBlackPeak;
else
    blackPeak=secondBlackPeak;
if(hist[firstWhitePeak]      >
hist[secondWhitePeak]*WhitePeakPercentage)
    whitePeak=firstWhitePeak;
else
    whitePeak=secondWhitekPeak;
```

One issue solved by the present invention is whether to select the first or second peak as the primary peak for black and for white, wherein the second peak is inboard of the first peak in the luminance histogram (i.e., for black peaks, the second peak has a higher luminance than the first peak, whereas for the white peaks, the second peak has a lower luminance than the first peak). Generally, the second peak is chosen unless the first peak value is larger than a specified percentage of the second peak value. The percentage is another control value for the algorithm and may have a separate value for the black and white peaks.

If the second peak is selected, the input image will be stretched more aggressively. More aggressive stretching will make text copies look better since more of the text will be pushed to black, but will cause loss of detail in shadows and highlights of photographs. The characteristics of the histogram can be used to categorize the image data as a document or a photograph.

The first step in deciding whether the image is a photograph or document is to calculate how much of the image is between the peaks. It is desired to exclude the data close to the peak with black or white so that the data may be counted starting at the peak with the down count included, which is referred to as the betweenPeaks value in the present embodiment. If the betweenPeaks value is more than a specified percentage of the total input, the image is considered to be a photograph, which has a lot of data in the middle tones as was indicated with respect to the photograph's luminance histogram (FIG. 2) above. The PhotoPercentage parameter is another control value for the algorithm.

If the image is considered a photograph, it must then be decided whether or not to force selection of the first peak. Some histograms will have a very small peak near the black and white points. If the small peak is too small, then it will be considered noise and should be ignored. An average middle tone histogram count is calculated from the betweenPeaks data. If the black peak is less than a specified percentage of the average middle tone value, then the selected peak is not too aggressive and the currently selected peak may be retained. If it is higher than the specified percentage, then the two peaks are compared to decide whether or not to default back to the first peak as the primary peak. If the first peak is greater than a specified percentage of the second peak, then the first peak is selected as the primary peak.

For example,

```
photograph = FALSE;
averageMidTone=betweenPeaksCount /
(betweenPeaksWidth);
if(betweenPeaksCount > totalImage*PhotoPercent)
{
    photograph = TRUE;
    if(peakBlack>(averageMidTone*
BlackMidtonePercent)
        {if(peakBlack1>(peakBlack*
BlackPeakPercent)
    {peakBlack = peakBlack1;peakBlackPosition =
peakBlack1Position;
        }
    }
}
```

The code is repeated for the white peaks.

The original algorithm used a single value for the desired black target and a single value for the desired white target. With text images, the desired black target is usually full black and the desired white target is full white. The peaks should be stretched to these values so that the text looks solidly black and the background looks white. A photograph has details in the shadows and highlights that it is desirable to retain. The peaks should be stretched closer to full black and white, but not all of the way so that detail in those areas is not lost. The solution for this problem is to have two sets of desired values one for documents and another for photographs. The addition of these control values allows us to improve our scaling of the input data.

For example,

```
if (photograph)
{if(peakBlack>(averageMidTone      *
BlackMidtonePercent)
    {DesiredBlack = DesiredBlackPhoto;
    }
    else
    {DesiredBlack = DesiredBlackDocument;
    }
}
```

The DesiredBlackDocument and DesiredWhiteDocument are normally set to a fixed value such as 0 and 255 (assuming 8-bit data). The DesiredBlackPhoto and DesiredWhitePhoto can be set to a fixed value, but normally will be calculated by taking a percentage of the distance of the peak from the maximum black or white points.

Stretching the peaks gives good results for most images. Some images need additional correction in order to further improve the image. A photograph may be underexposed or overexposed. A brightness or contrast adjustment is required to address these issues. The characteristics of the image are analyzed to determine how much brightness or contrast adjustment to apply. The ratio of the total black count versus the total white count is calculated. If one is larger than the other by a specified factor, then an adjustment is required. The threshold ratio is another control value.

Once it is determined that an adjustment is necessary, a relative adjustment value needs to be calculated. In the present embodiment 2 levels of adjustment are employed, but more could be added if necessary without departing from the scope of the present invention. The adjustment level may be determined by comparing the total black or white count with the amount left over after removing the total black and white count. For example, totalBlack+leftover+totalWhite=totalImage. The black or white totals relative to the leftover value are compared to a set of thresholds, which determine the brightness or contrast adjustment factor. For example, the total black or white value may be compared with a percentage of the leftover value. If the total black or white value is within a specified percentage range of the leftover value, then an adjustment factor is selected. Alternatively, it is contemplated that the comparison may be made relative to the maximum black or white width and the leftover amount. The maximum width can be used to calculate an estimate for a total black level, which can be compared with the actual totalBlack value. These two exemplary and alternative processes are illustrated via the pseudo code that follows.

```
if (photograph)
{if (totalBlack > totalWhite*BlackWhiteRatio)
    {if (totalBlack > leftover)
        {brightnessAdjustment = MUCH_BRIGHTER;
        }
        if
totalBlack>(leftover*(MaxBlackWidth/(255–
(MaxBlackWidth+MaxWhiteWidth)))*
BlackThreshold2Percent)
        {brightnessAdjustment = SOMEWHAT_BRIGHTER;
        }
    }
```

```
        if (totalWhite > totalBlack*BlackWhiteRatio)
        {if (totalWhite > leftover)
                {brightnessAdjustment = MUCH_DARKER;
                }
                if (totalWhite >
>(leftover*(MaxWhiteWidth/(255−
(MaxBlackWidth+MaxWhiteWidth)))
                        *WhiteThreshold2Percent)
                {
                        brightnessAdjustment =
SOMEWHAT_DARKER;
                }
        }
}
OR
    if (photograph)
    {if(totalBlack > totalWhite*BlackWhiteRatio)
        {if (totalBlack > leftover)
                {
                brightnessAdjustment= MUCH_BRIGHTER;
                }
                if(totalBlack>(leftover*(MaxBlackWidth/(255−
(MaxBlackWidth)))
                        *BlackThreshold2Percent)
                {
                        brightnessAdjustment=
SOMEWHAT_BRIGHTER;
                }
        }
        if(totalWhite> totalBlack*BlackWhiteRatio)
        {if (totalWhite > leftover)
                {brightnessAdjustment = MUCH_DARKER;
                }
                if(totalWhite>
(leftover*(MaxWhiteWidth/(255−(MaxWhiteWidth)))
                        *WhiteThreshold2Percent)
                {brightnessAdjustment=
SOMEWHAT_DARKER;
                }
        }
}
```

Step S108 is described below in greater detail with respect to FIGS. 10A-10D and steps S108-1 to S108-37.

At step S110, luminance scaling of the image is performed as between one black peak of the plurality of black peaks, i.e., the primary black peak, and one white peak of the plurality of white peaks, i.e., the primary white peak. At this point, the white and black peak have been determined. Generally, the luminance of each image location is compared with the white and black peaks. If the luminance is at or below the black peak, then it is set to the desired black level. If the luminance is at or above the white peak, then it is set to the desired white value. The desired white and black values are additional control values for the algorithm. If the luminance is between the black and white peak, then it is scaled to value between the desired black and desired white values.

Figure 7:
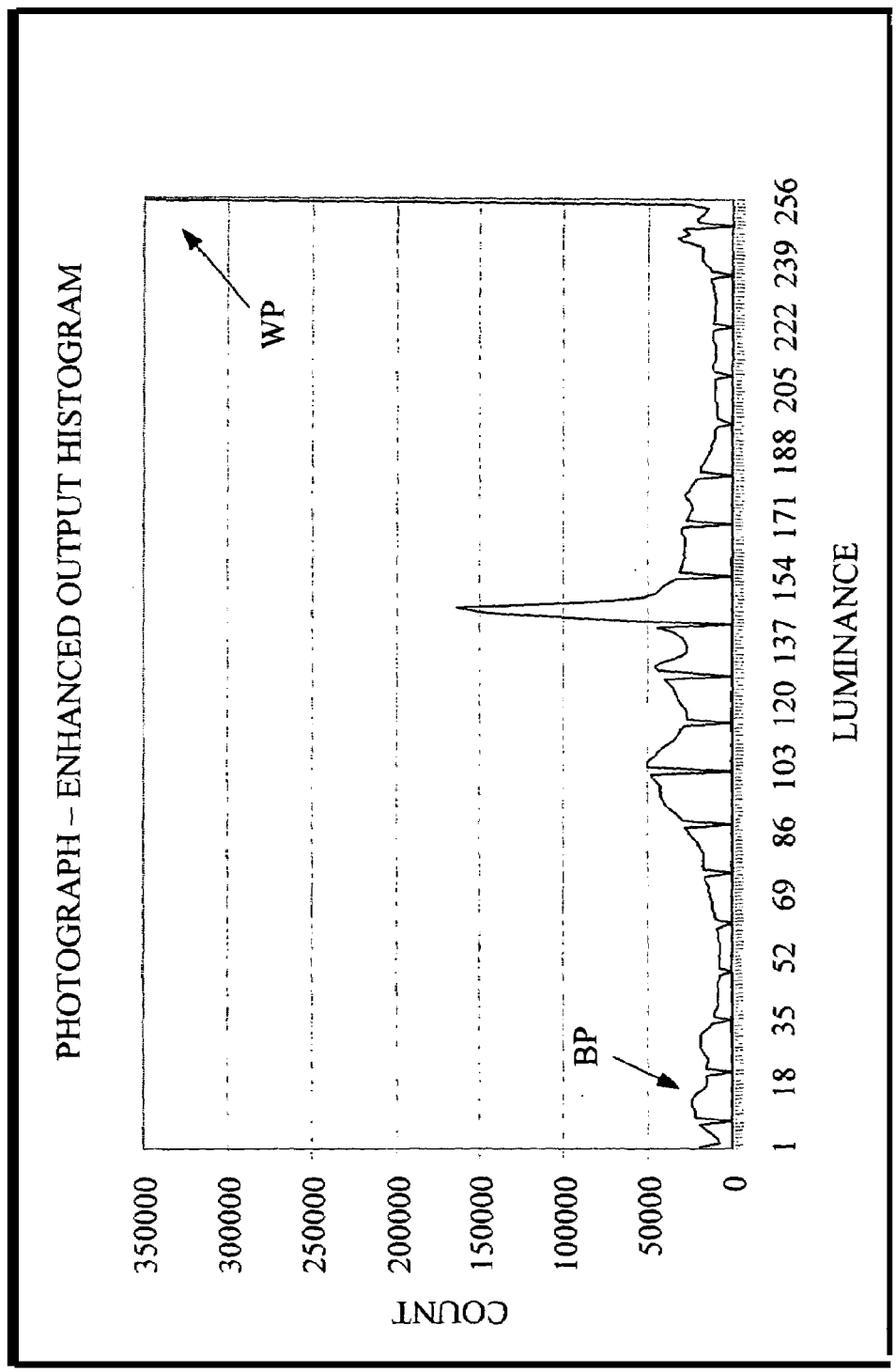
FIG. 7 is an output histogram depicting an enhanced output of the first image in accordance with an embodiment of the present invention.
Figure 8:
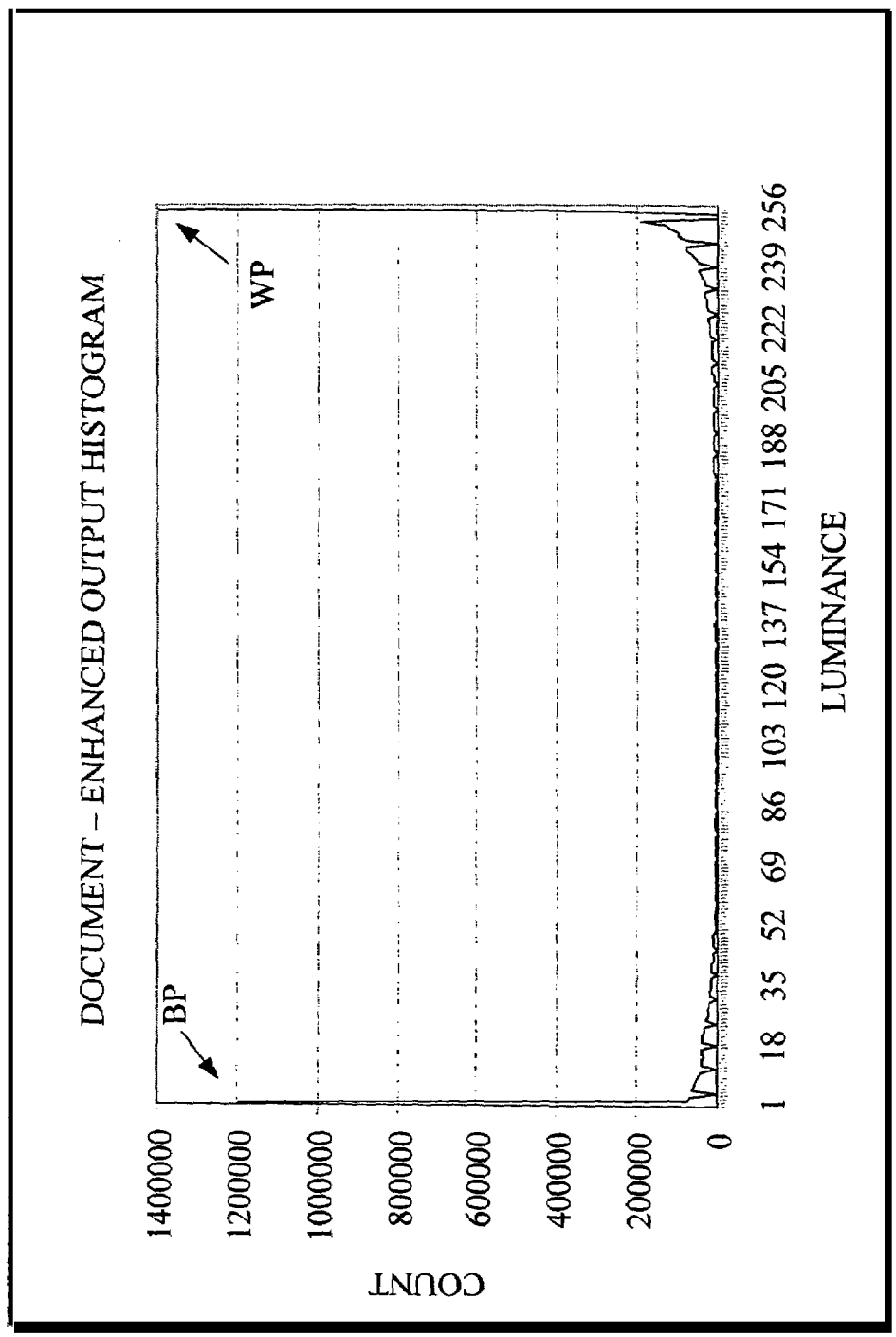
FIG. 8 is an output histogram depicting an enhanced output of the second image in accordance with an embodiment of the present invention.

Referring again to FIGS. 7 and 8, the enhanced output of the images corresponding to FIGS. 2 and 3, respectively, after the luminance scaling, are depicted.

The below pseudo-code describes an exemplary process for performing luminance scaling.

```
        ScaleData(inputValue)
        {
        outputValue=(inputValue −
        blackPeak) * ((DesiredWhiteValue−
        DesiredBlackValue)/(whitePeak−
        blackPeak))+DesiredBlackValue;
        if (outputValue < 0) then outputValue=0;
```

```
        if (outputValue > 255) then outputValue=255;
        return outputValue;
        }
```

Figure 9A:
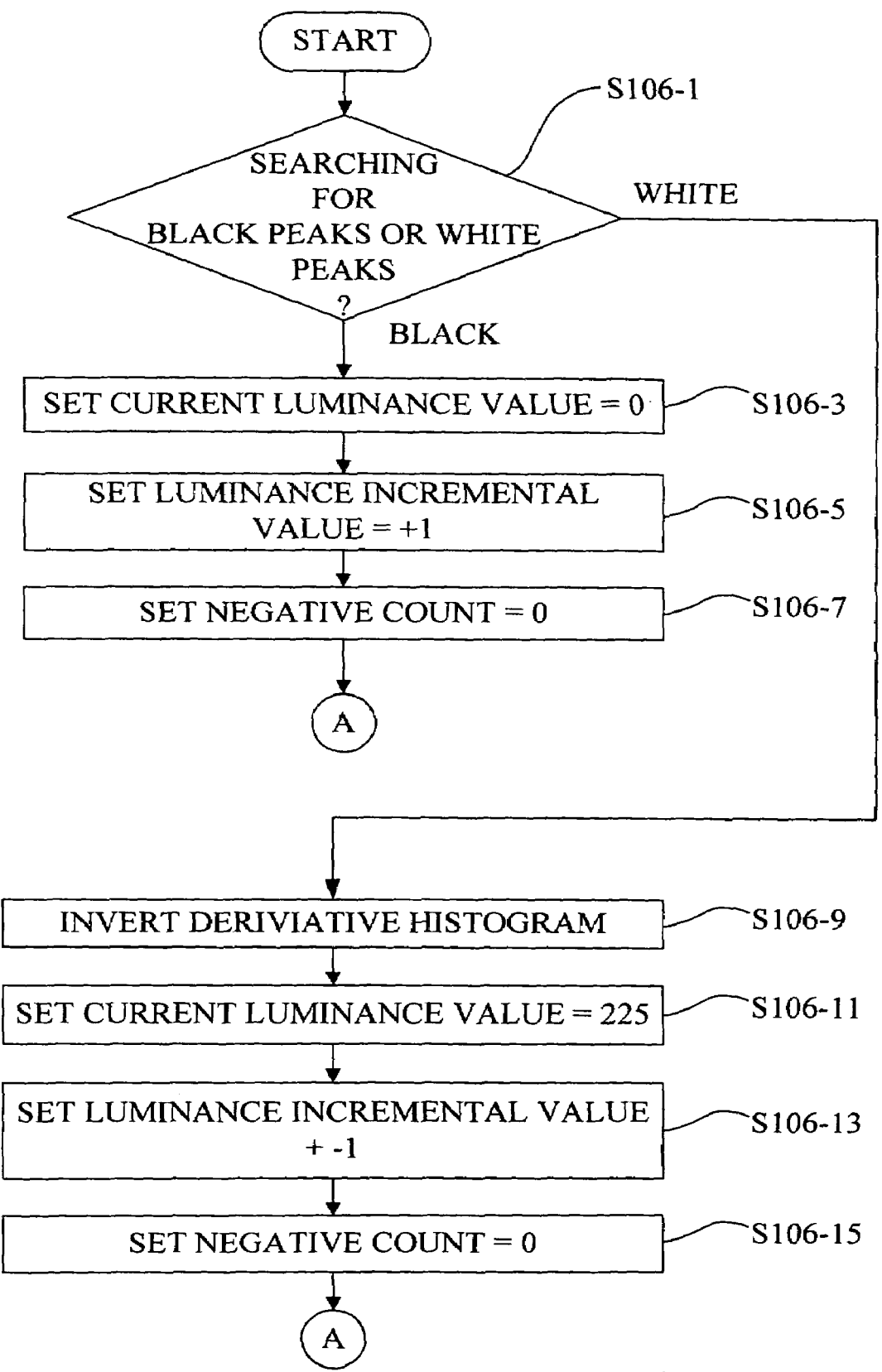
FIGS. 9A-9D are a detailed flowchart depicting a method of searching for peaks in accordance with the embodiment of FIG. 4.

Referring now to FIGS. 9A-9D, and more particularly, to FIG. 9A, searching for a plurality of black peaks and searching for a plurality of white peaks using the derivative histogram, as set forth above with respect to step S106, is described in greater detail below with respect to steps S106-1 to S106-37.

As set forth below, when searching for the plurality of black peaks, the negative derivative count is incremented if a current luminance position is greater than the luminance at the maximum black value (count) and a current luminance histogram value is less than a predefined percentage of the maximum black value, without regard to the current derivative histogram value associated with the current luminance position. Similarly, when searching for the plurality of white peaks, the negative derivative count is incremented if the current luminance position is less than the luminance at the maximum white value (count) and the current luminance histogram value is less than a predefined percentage of the maximum white value, without regard to the current derivative histogram value associated with the current luminance position.

A different negative increment control value may be used when searching for the plurality of black peaks than may be used when searching for the plurality of white peaks. In addition, a maximum search parameter is set for limiting the searching for local maxima to a predefined luminance range corresponding to the maximum search parameter. The maximum search parameter used for searching for the plurality of black peaks may be different than the maximum search parameter used for searching for the plurality of white peaks, such that a different predefined luminance range is used for searching for the plurality of black peaks than is used for searching for the plurality of white peaks. In the present embodiment, the searching for the plurality of black peaks is performed in the direction of increasing luminance, and the searching for the plurality of white peaks is performed in the direction of decreasing luminance. However, those skilled in the art would appreciate that any direction of searching may be performed without departing from the scope of the present invention.

In performing the searching for black and white peaks in the present embodiment, searching is performed for the black peaks, and is then performed for the white peaks.

At step S106-1, a determination is made as to whether the current search is for the black peaks or for the white peaks. If the search is being performed for the black peaks, process flow proceeds to step S106-3. Otherwise, process flow proceeds to step S106-9.

At step S106-3, the current luminance value is set to zero in order to begin the search for black peaks at the beginning of the luminance and derivative histograms.

At step S106-5, a luminance incremental value is set at +1. As a result, the search for black peaks is performed in the direction of increasing luminance.

At step S106-7, the negative count, i.e., the negative derivative count, is set to zero.

At step S106-9, if the current search is for white peaks, the derivative histogram, for example, the right side of the derivative histogram, is inverted. The inversion may be performed, for example, by multiplying the first derivative values by −1

(negative one), or by calculating the first derivative values from the white end of the luminance histogram when initially generating the white side of the derivative histogram.

At step S106-11, the current luminance value is set to the maximum luminance value, e.g., 255 for 8-bit representation, in order to begin the search for white peaks at the end of the luminance and derivative histograms.

At step S106-13, the luminance incremental value is set at −1. As a result, the search for white peaks is performed in the direction of decreasing luminance.

At step S106-15, the negative count is set to zero.

The following steps S106-17 to S106-37 are performed similarly when searching for the black peaks and when searching for white peaks.

Figure 9B:
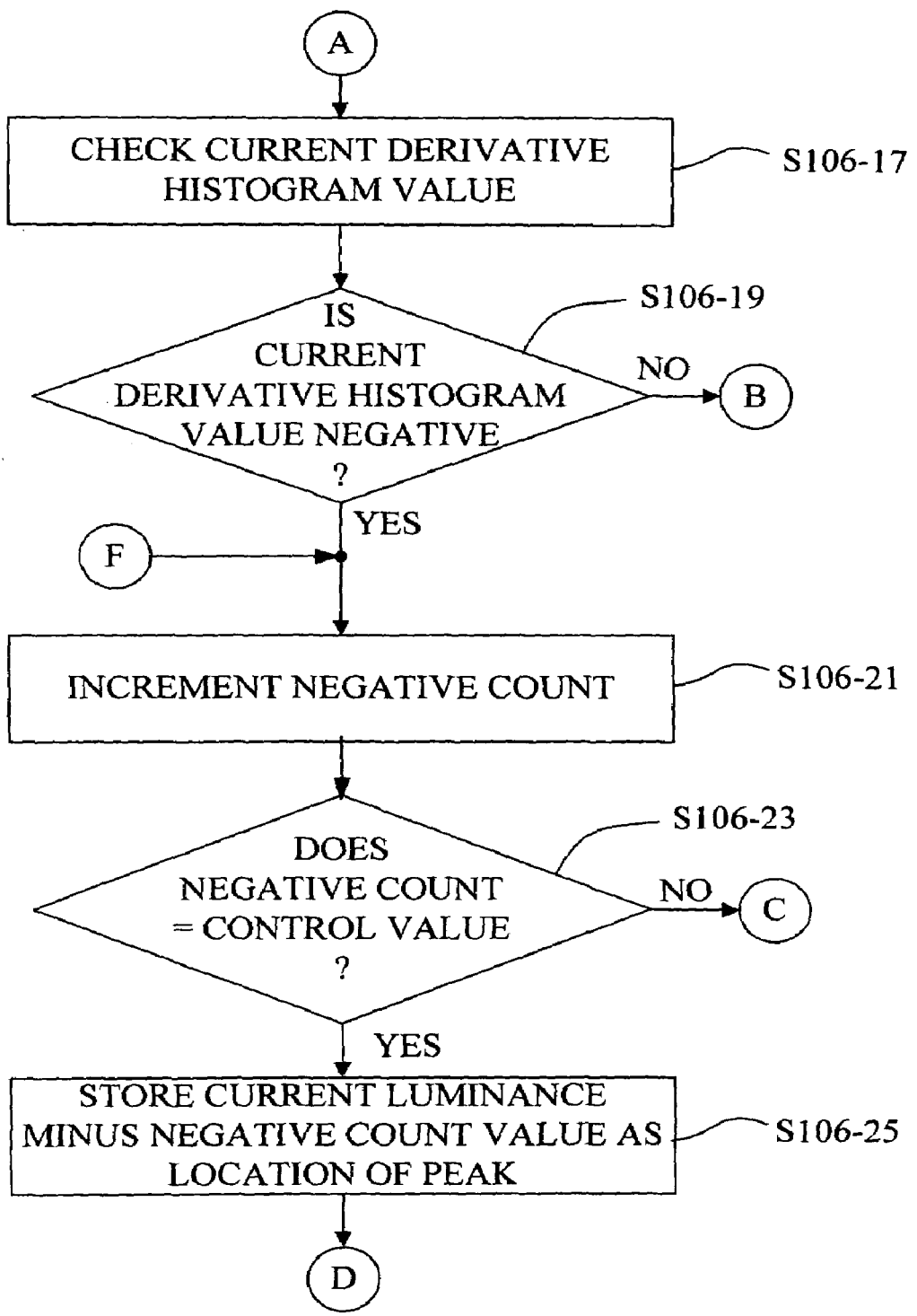

Referring now to FIG. 9B, at step S106-17, the current derivative histogram is checked to determine the derivative histogram value corresponding to the current luminance value.

At step S106-19, a determination is made as to whether the current derivative histogram value is negative. If so, process flow proceeds to step S106-21. Otherwise, process flow proceeds to step S106-35.

At step S106-21, the negative derivative count is incremented.

At step S106-23, a determination is made as to whether the negative count control value (down count) is reached, e.g., whether the negative derivative count equals the control value. If not, process flow proceeds to step S106-29. Otherwise, process flow proceeds to step S106-25.

At Step S106-25, the current luminance value minus negative count value is stored as the location of a peak.

Figure 9C:
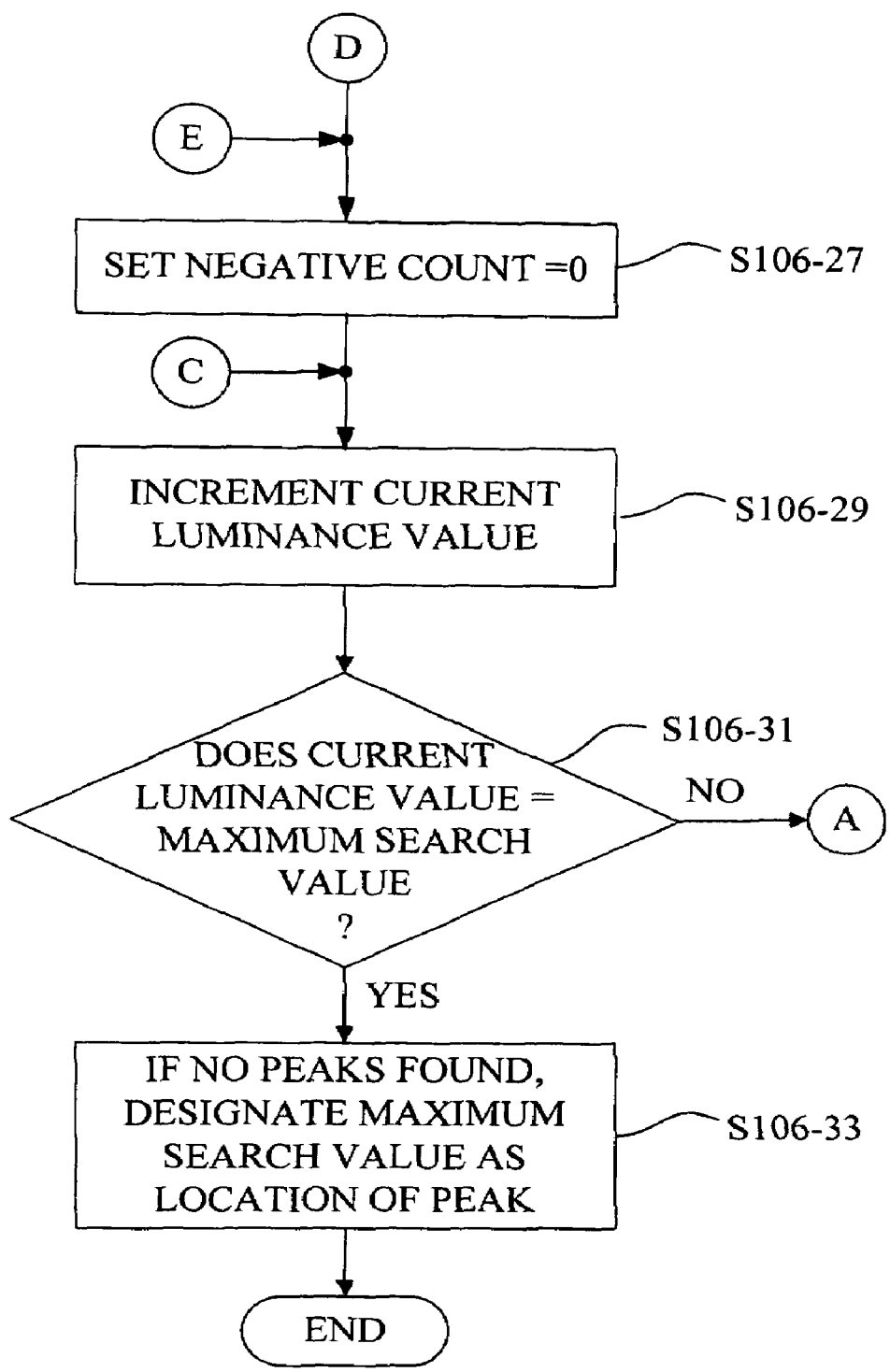

Referring now to FIG. 9C, at step S106-27, the negative derivative count is reset to zero.

At step S106-29, the current luminance value is incremented.

At step S106-31, a determination is made as to whether the current luminance value has reached the maximum search value. The maximum search value limits the extent of the searching, as set forth above (MaxBlackWidth and MaxWhiteWidth). Note that the maximum search value may be different for black peak searching than for white peak searching. If the maximum search value has been reached, process flow proceeds to step S106-33. Otherwise, process flow proceeds back to step S106-17.

At step S106-33, if no peaks were found, the maximum search value is designated as the location of a peak, which will be used in performing luminance scaling.

Figure 9D:
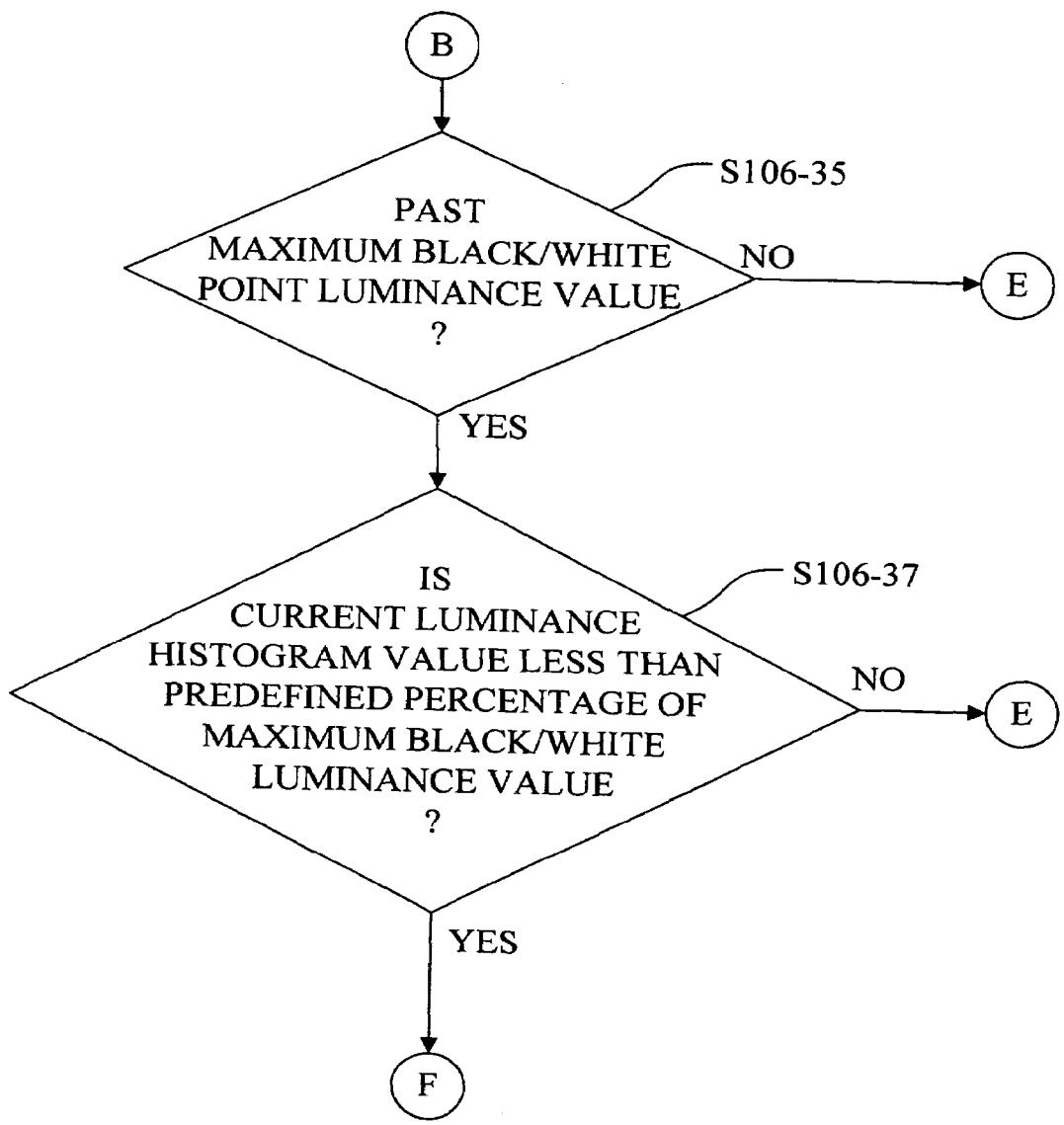

Referring now to FIG. 9D, at step S106-35, if in the determination of step S106-19 it was found that the current derivative histogram value is not negative, a determination is made as to whether the current luminance value is past, e.g., greater than, the maximum black point luminance or the maximum white point luminance, as appropriate, depending on whether the search is for black or white peaks. If not, process flow proceeds back to step S106-27. Otherwise, process flow proceeds to step S106-37.

At step S106-37, a determination is made as to whether the current luminance histogram value is less than a predefined percentage of the maximum black point count or the maximum white point luminance value, as appropriate, depending upon whether the search if for black peaks or for white peaks. If so, process flow proceeds back to step S106-21. Otherwise, process flow proceeds back to step S106-27.

Figure 10A:
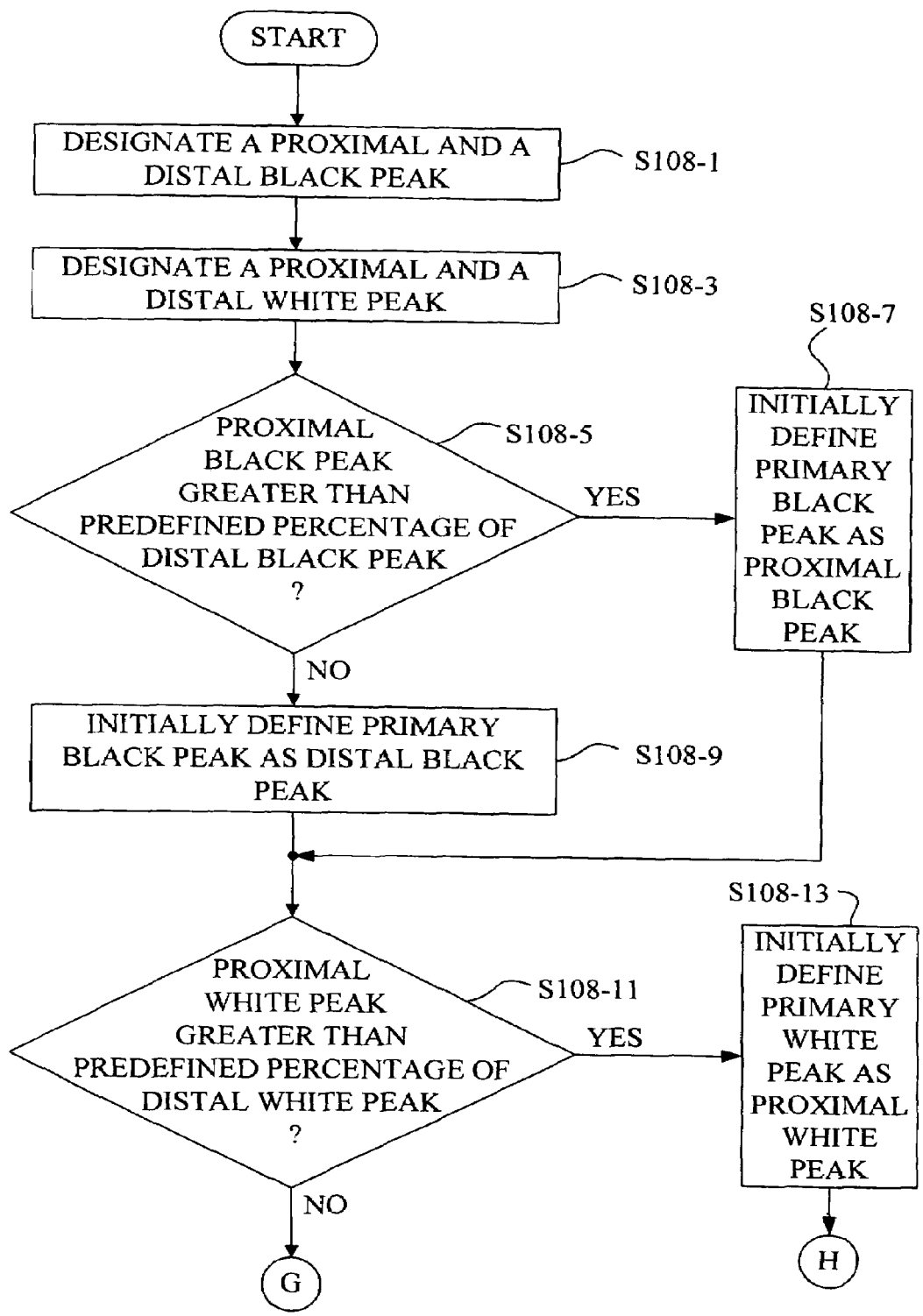
FIGS. 10A-10D are a detailed flowchart depicting a method designating primary peaks in accordance with the embodiment of FIG. 4.

Referring now to FIGS. 10A-10D, and more particularly, to FIG. 10A, step S108, wherein a primary black peak from the plurality of black peaks is designated, and a primary white peak from the plurality of white peaks is designated, is described in greater detail below with respect to steps S108-1 to S108-37.

As would be appreciated by those skilled in the art, the plurality of black peaks and the plurality of white peaks are distributed along a luminance scale, e.g., the abscissa of the luminance histogram. The plurality of black peaks includes at least a proximal black peak and a distal black peak having a higher luminance on the luminance scale than the proximal black peak, wherein "proximal" refers to the fact that the peak is close to end of the luminance scale, which is zero luminance as regards the black peaks. "Distal" refers to peaks that are inboard of the bounds of the luminance scale, and hence, a distal black peak has a higher luminance than a proximal black peak. The terms "distal" and "proximal" as used herein are relative terms, and may each be applicable to more than one peak.

For example, a first black peak may be a proximal peak in relation to a second black peak having a higher luminance, which may be referred to as a distal peak. However, the second black peak may be a proximal black peak in relation to a third black peak that has an even higher luminance, which is a distal black peak when considered in relation to the second black peak.

Similarly, the plurality of white peaks including at least a proximal white peak and a distal white peak having a lower luminance on the luminance scale than the proximal white peak. The terms, "proximal" and "distal" as used with respect to white peaks are relative terms as set forth above with respect to black peaks, except that when used with respect to white peaks, "distal" peaks have a lower luminance than "proximal" peaks.

The present invention includes determining a percentage of the image that is located between the an initial primary black peak and an initial primary white peak (referred to as the "betweenPeaks" parameter set forth above, and includes determining a middle tone histogram value, and determining a total image count based on based on the luminance histogram. These parameters are used in defining the primary black peak and the primary white peak. For example, the present invention includes defining the primary black peak as being the distal black peak if the distal black peak is less than a first predefined percentage of the middle tone histogram value and the percentage of the image that is located between the distal black peak and the distal white peak is greater than a first predefined percentage of the total image count. Otherwise the primary black peak is defined as being the proximal black peak. Similarly, the primary white peak is defined as being the distal white peak if the distal white peak is less than a second predefined percentage of the middle tone histogram value and the percentage of the image that is located between the distal black peak and the distal white peak is greater than a second predefined percentage of the total image count. Otherwise the primary white peak is defined as being the proximal white peak.

In addition, the present invention includes defining the primary black peak as being the distal black peak unless the proximal black peak is greater than a predefined percentage of the distal black peak, otherwise defining the primary black peak as being the proximal black peak. Similarly the primary white peak is defined as being the distal white peak unless the proximal white peak is greater than a predefined percentage of the distal white peak. Otherwise the primary white peak is defined as being the proximal white peak.

Although the present embodiment selects and makes decisions as between designating a proximal and a distal peak as being a primary peak, it will be understood by those skilled in the art that a selection as between any number of peaks as a primary peak may be made without departing from the scope of the present invention.

At step S108-1, a proximal black peak and a distal black peak are designated.

At step S108-3, a proximal white peak and a distal white peak are designated.

At step S108-5, a determination is made as to whether the proximal black peak, e.g., the count value, is greater than a predefined percentage of the distal black peak, e.g., it's count value. If so, process flow proceeds to step S108-7, wherein the primary black peak is initially defined as being the proximal black peak. Otherwise, the primary black peak is initially defined as the distal black peak in step S1108-9.

At step S108-11, a determination is made as to whether the proximal white peak, e.g., the count value, is greater than a predefined percentage of the distal white peak, e.g., it's count value. If so, process flow proceeds to step S108-13, wherein the primary white peak is initially defined as being the proximal white peak. Otherwise, process flow proceeds to step S108-15.

Figure 10B:
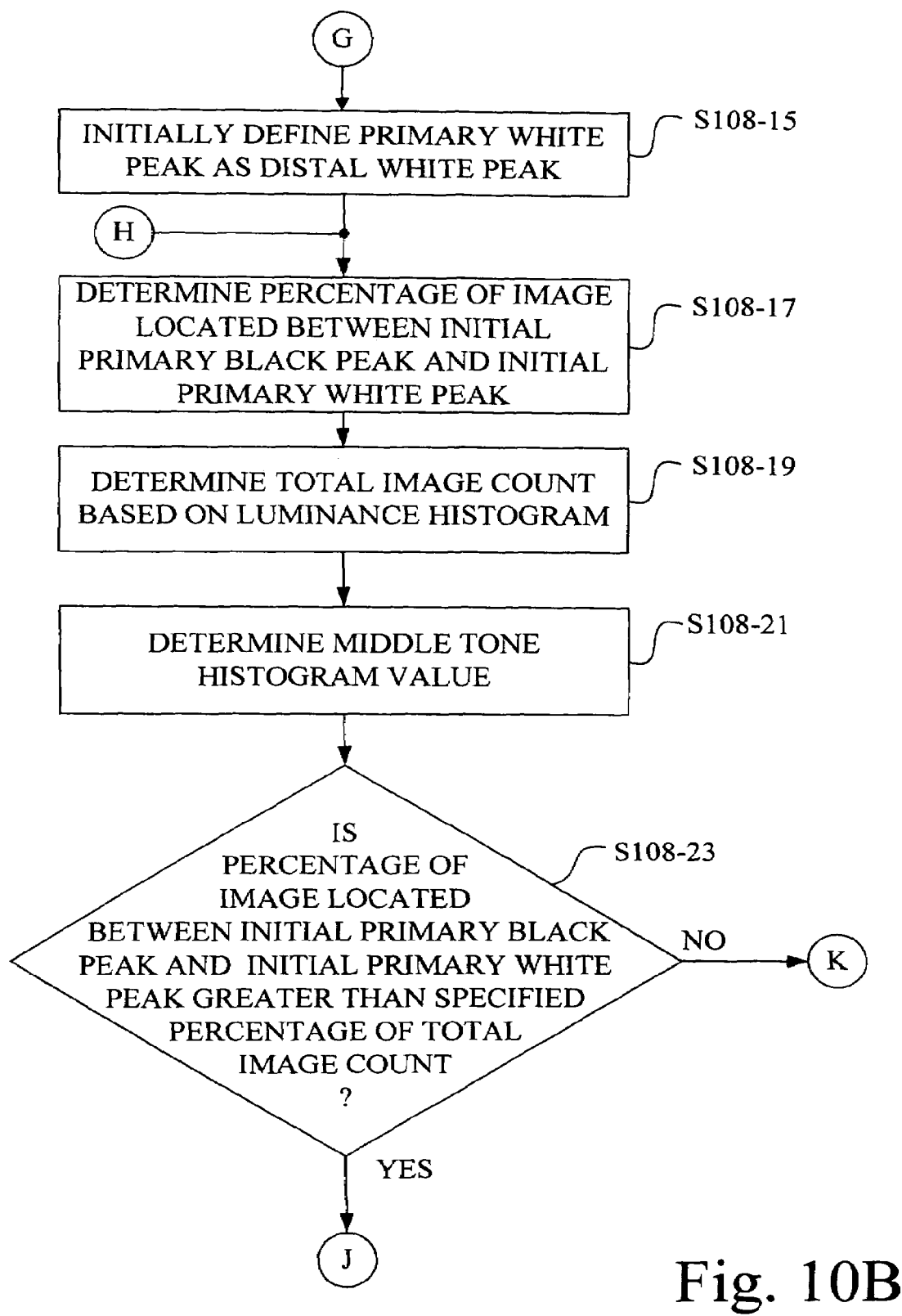

Referring now to FIG. 10B, if the proximal white peak is not greater than the predefined percentage of the distal white peak, the primary white peak is initially defined as the distal white peak at step S108-15.

At step S108-17, a percentage of the image that is located between the initial primary black peak and the initial primary white peak is determined, for example, as the total of the count values of the luminance histogram that occur between the distal black peak and the distal white peak.

At step S108-19, the total image count is determined based on the luminance histogram, for example, as the total of the count values of the luminance histogram in its entirety.

At step S108-21, a middle tone histogram value is determined, for example, as the average count value of a middle portion of the luminance histogram.

At step S108-23, a determination is made as to whether the percentage of the image located between the initially designated primary black peak and the initially designated primary white peak is greater than a specified percentage of the total image count. If so, process flow proceeds to step S108-25. Otherwise, process flow proceeds to step S108-29.

Figure 10C:
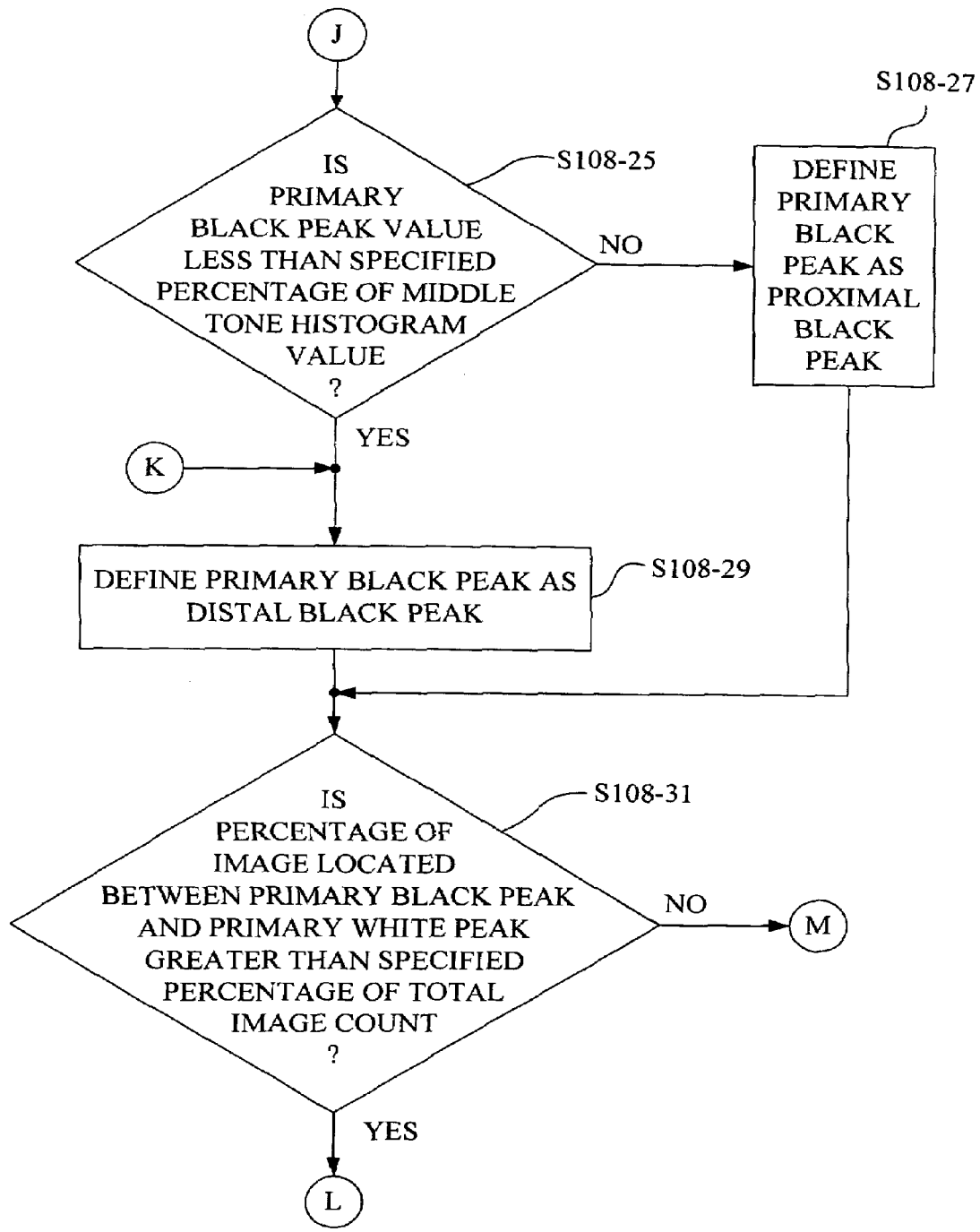

Referring now to FIG. 10C, at step S108-25, a determination is made as to whether the primary black peak, e.g., its count value, is less than a specified percentage of the middle tone histogram value. If not, process flow proceeds to step S108-27. Otherwise, process flow proceeds to step S108-29.

At step S108-27, the primary black peak is defined as being the proximal black peak, notwithstanding a previous initial decision otherwise.

At step S108-29, the primary black peak is defined as being the distal black peak, notwithstanding a previous initial decision otherwise.

At step S108-31, a determination is made as to whether the percentage of the image located between the primary black peak and the primary white peak is greater than a specified percentage of the total image count. If so, process flow proceeds to step S108-33. Otherwise, process flow proceeds to step S108-37

Figure 10D:
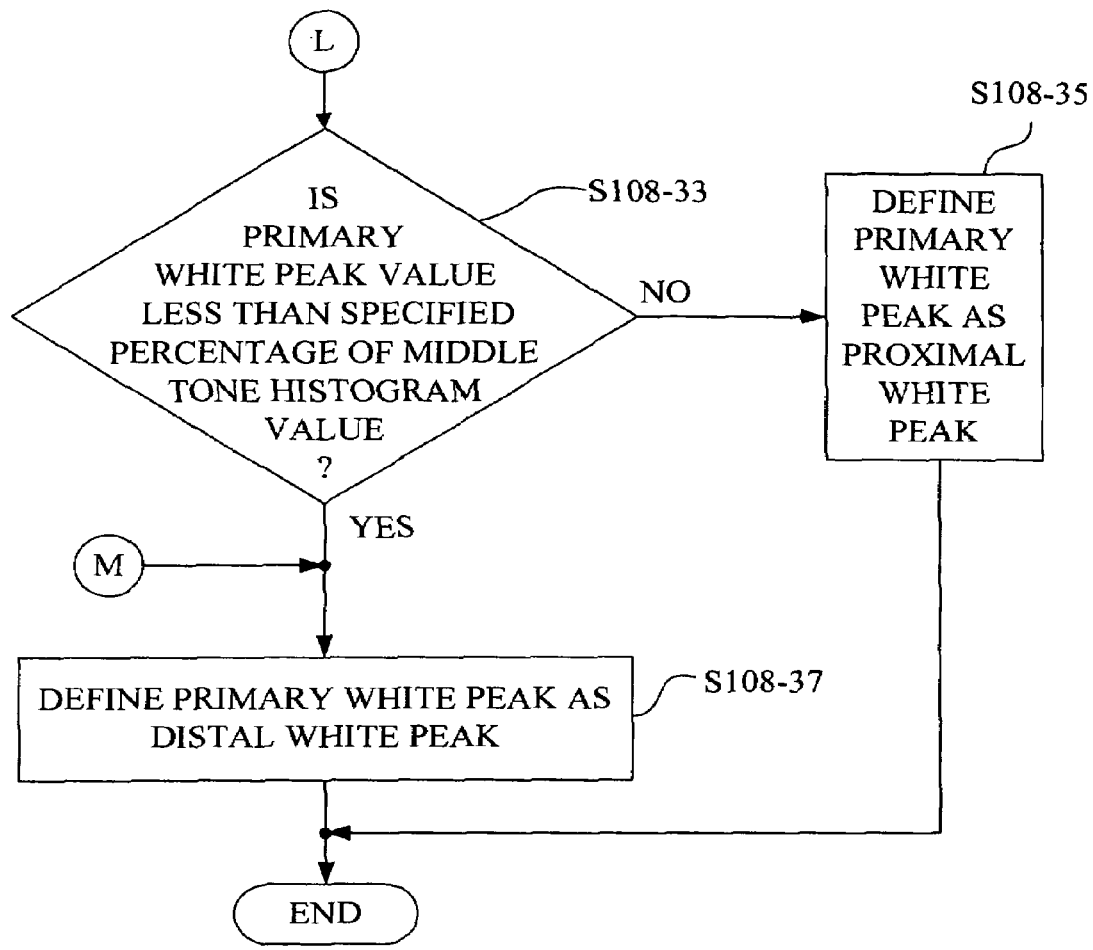

Referring now to FIG. 10D, at step S108-33, a determination is made as to whether the primary white peak, e.g., its count value, is less than a specified percentage of the middle tone histogram value. If not, at step S108-35, the primary white peak is defined as being the proximal white peak, notwithstanding a previous initial decision otherwise. If so, process flow proceeds to step S108-37.

At step S108-37, the primary white peak is defined as being the distal white peak, notwithstanding a previous initial decision otherwise.

While this invention has been described with respect to exemplary embodiments, it will be recognized that the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for enhancing an image, comprising:
generating a luminance histogram for said image;
generating a derivative histogram by taking a first derivative of said luminance histogram;
searching for a plurality of black peaks and searching for a plurality of white peaks using said derivative histogram;
obtaining a maximum black value and a maximum white value from said luminance histogram;
obtaining a black luminance associated with said maximum black value and a white luminance associated with said maximum white value, wherein when searching for said plurality of black peaks, said negative derivative count is incremented if a current luminance position is greater than said black luminance and a current luminance histogram value is less than a predefined percentage of said maximum black value, without regard to the current derivative histogram value associated with said current luminance position, and wherein when searching for said plurality of white peaks, said negative derivative count is incremented if said current luminance position is less than said white luminance and said current luminance histogram value is less than a predefined percentage of said maximum white value, without regard to the current derivative histogram value associated with said current luminance position; and
performing luminance scaling of said image between one black peak of said plurality of black peaks and one white peak of said plurality of white peaks, wherein a different search parameter is used for said searching for said plurality of black peaks than is used for said searching for said plurality of white peaks.

2. The method of claim 1, wherein said searching for said plurality of black peaks and said searching for said plurality of white peaks includes searching to determine a plurality of local maxima based on a zero first derivative value using said derivative histogram.

3. The method of claim 2, further comprising setting a maximum search parameter for limiting said searching for said local maxima to a predefined luminance range corresponding to said maximum search parameter.

4. The method of claim 3, wherein a different of said maximum search parameter is used for said searching for said plurality of black peaks than is used for said searching for said plurality of white peaks, such that a different of said predefined luminance range is used for said searching for said plurality of black peaks than is used for searching for said plurality of white peaks.

5. The method of claim 2, further comprising inverting at least a portion of said derivative histogram when searching for said plurality of white peaks.

6. The method of claim 2, further comprising incrementing a negative derivative count when searching said derivative histogram, wherein each of said plurality of local maxima is determined based on comparing said negative derivative count to a negative increment control value, and wherein said negative derivative count is a consecutive number of negative derivative values along said derivative histogram from said local maxima.

7. The method of claim 6, wherein a different negative increment control value is used when searching for said plurality of black peaks than is used when searching for said plurality of white peaks.

8. A method for enhancing an image, comprising:
generating a luminance histogram for said image;
generating a derivative histogram by taking a first derivative of said luminance histogram;
searching for a plurality of black peaks and searching for a plurality of white peaks using said derivative histogram; and
performing luminance scaling of said image between one black peak of said plurality of black peaks and one white peak of said plurality of white peaks;
wherein said searching for said plurality of black peaks and said searching for said plurality of white peaks includes searching to determine a plurality of local maxima based on a zero first derivative value using said derivative histogram;
further comprising incrementing a negative derivative count when searching said derivative histogram, wherein each of said plurality of local maxima is determined based on comparing said negative derivative count to a negative increment control value, and wherein said negative derivative count is a consecutive number of negative derivative values along said derivative histogram from said local maxima; and further comprising:
obtaining a maximum black value and a maximum white value from said luminance histogram;
obtaining a black luminance associated with said maximum black value and a white luminance associated with said maximum white value, wherein when searching for said plurality of black peaks, said negative derivative count is incremented if a current luminance position is greater than said black luminance and a current luminance histogram value is less than a predefined percentage of said maximum black value, without regard to the current derivative histogram value associated with said current luminance position, and wherein when searching for said plurality of white peaks, said negative derivative count is incremented if said current luminance position is less than said white luminance and said current luminance histogram value is less than a predefined percentage of said maximum white value, without regard to the current derivative histogram value associated with said current luminance position.

9. The method of claim 1, further comprising:
designating a primary black peak from said plurality of black peaks; and
designating a primary white peak from said plurality of white peaks, wherein said luminance scaling of said image is performed between said primary black peak and said primary white peak.

10. A method for enhancing an image, comprising:
generating a luminance histogram for said image;
generating a derivative histogram by taking a first derivative of said luminance histogram;
searching for a plurality of black peaks and searching for a plurality of white peaks using said derivative histogram; and
performing luminance scaling of said image between one black peak of said plurality of black peaks and one white peak of said plurality of white peaks; further comprising:
designating a primary black peak from said plurality of black peaks; and
designating a primary white peak from said plurality of white peaks, wherein said luminance scaling of said image is performed between said primary black peak and said primary white peak; and
wherein said plurality of black peaks and said plurality of white peaks are distributed along a luminance scale, said plurality of black peaks including at least a proximal black peak and a distal black peak having a higher luminance on said luminance scale than said proximal black peak, said plurality of white peaks including at least a proximal white peak and a distal white peak having a lower luminance on said luminance scale than said proximal white peak, further comprising:
defining said primary black peak as being said distal black peak unless said proximal black peak is greater than a predefined percentage of said distal black peak, otherwise defining said primary black peak as being said proximal black peak; and
defining said primary white peak as being said distal white peak unless said proximal white peak is greater than a predefined percentage of said distal white peak, otherwise defining said primary white peak as being said proximal white peak.

11. A method for enhancing an image, comprising:
generating a luminance histogram for said image;
generating a derivative histogram by taking a first derivative of said luminance histogram;
searching for a plurality of black peaks and searching for a plurality of white peaks using said derivative histogram; and
performing luminance scaling of said image between one black peak of said plurality of black peaks and one white peak of said plurality of white peaks; further comprising:
designating a primary black peak from said plurality of black peaks; and
designating a primary white peak from said plurality of white peaks, wherein said luminance scaling of said image is performed between said primary black peak and said primary white peak; wherein said plurality of black peaks and said plurality of white peaks are distributed along a luminance scale, said plurality of black peaks including at least a proximal black peak and a distal black peak having a higher luminance on said luminance scale than said proximal black peak, said plurality of white peaks including at least a proximal white peak and a distal white peak having a lower luminance on said luminance scale than said proximal white peak, further comprising:
designating as an initial primary black peak one of said proximal black peak and said distal black peak;
designating as an initial primary white peak one of said proximal white peak and said distal white peak;
determining a percentage of said image that is located between said initial primary black peak and said initial primary white peak;
determining a middle tone histogram value;
determining a total image count based on said luminance histogram;
defining said primary black peak as being said initial primary black peak if said initial primary black peak is less than a first predefined percentage of said middle tone histogram value and said percentage of said image that is located between said initial primary black peak and said initial primary white peak is greater than a first predefined percentage of said total image count, otherwise defining said primary black peak as being said proximal black peak; and defining said primary white peak as being said initial primary white peak if said initial primary white peak is less than a second predefined percentage of said middle tone histogram value and said percentage of said image that is located between said initial primary black peak and said initial primary white peak is greater than a second predefined percentage of said total image count, otherwise defining said primary white peak as being said proximal white peak.

12. The method of claim 1, wherein said searching for said plurality of black peaks is performed in a direction of increasing luminance, and wherein said searching for said plurality of white peaks is performed in a direction of decreasing luminance.

13. The method of claim 1, further comprising determining at least one of a brightness adjustment and a contrast adjustment for said image based on comparing a total black count from said luminance histogram with a total white count of said luminance histogram.

14. An imaging apparatus configured for enhancing an image for printing, comprising:
   a print engine configured to mount a cartridge; and
   a controller communicatively coupled to said print engine, said controller being configured to execute instructions for:
      generating a luminance histogram for said image;
      generating a derivative histogram by taking a first derivative of said luminance histogram;
      searching for a plurality of black peaks and searching for a plurality of white peaks using said derivative histogram, wherein a different search parameter is used for said searching for said plurality of black peaks than is used for said searching for said plurality of white peaks;
      obtaining a maximum black value and a maximum white value from said luminance histogram;
      obtaining a black luminance associated with said maximum black value and a white luminance associated with said maximum white value, wherein when searching for said plurality of black peaks, said negative derivative count is incremented if a current luminance position is greater than said black luminance and a current luminance histogram value is less than a predefined percentage of said maximum black value, without regard to the current derivative histogram value associated with said current luminance position, and wherein when searching for said plurality of white peaks, said negative derivative count is incremented if said current luminance position is less than said white luminance and said current luminance histogram value is less than a predefined percentage of said maximum white value, without regard to the current derivative histogram value associated with said current luminance position; and
      performing luminance scaling of said image between one black peak of said plurality of black peaks and one white peak of said plurality of white peaks.

15. The imaging apparatus of claim 14, wherein said searching for said plurality of black peaks and said searching for said plurality of white peaks includes searching to determine a plurality of local maxima based on a zero first derivative value using said derivative histogram.

16. The imaging apparatus of claim 15, further comprising said controller being configured to execute instructions for setting a maximum search parameter for limiting said searching for said local maxima to a predefined luminance range corresponding to said maximum search parameter.

17. The imaging apparatus of claim 16, wherein a different maximum search parameter is used for said searching for said plurality of black peaks than is used for said searching for said plurality of white peaks, such that a different predefined luminance range is used for said searching for said plurality of black peaks than is used for searching for said plurality of white peaks.

18. The imaging apparatus of claim 15, further comprising said controller being configured to execute instructions for inverting at least a portion of said derivative histogram when searching for said plurality of white peaks.

19. The imaging apparatus of claim 15, further comprising said controller being configured to execute instructions for incrementing a negative derivative count when searching said derivative histogram, wherein each of said plurality of local maxima is determined based on comparing said negative derivative count to a negative increment control value, and wherein said negative derivative count is a consecutive number of negative derivative values along said derivative histogram from said local maxima.

20. The imaging apparatus of claim 19, wherein a different negative increment control value is different when searching for said plurality of black peaks than is used when searching for said plurality of white peaks.

21. An imaging apparatus configured for enhancing an image for printing, comprising:
   a print engine configured to mount a cartridge; and
   a controller communicatively coupled to said print engine, said controller being configured to execute instructions for:
   generating a luminance histogram for said image;
   generating a derivative histogram by taking a first derivative of said luminance histogram; searching for a plurality of black peaks and searching for a plurality of white peaks using said derivative histogram; and
   performing luminance scaling of said image between one black peak of said plurality of black peaks and one white peak of said plurality of white peaks;
   wherein said searching for said plurality of black peaks and said searching for said plurality of white peaks includes searching to determine a plurality of local maxima based on a zero first derivative value using said derivative histogram; further comprising said controller being configured to execute instructions for incrementing a negative derivative count when searching said derivative histogram, wherein each of said plurality of local maxima is determined based on comparing said negative derivative count to a negative increment control value, and wherein said negative derivative count is a consecutive number of negative derivative values along said derivative histogram from said local maxima; further comprising said controller being configured to execute instructions for: obtaining a maximum black value and a maximum white value from said luminance histogram; obtaining a black luminance associated with said maximum black value and a white luminance associated with said maximum white value, wherein when searching for said plurality of black peaks, said negative derivative count is incremented if a current luminance position is greater than said black luminance and a current luminance histogram value is less than a predefined percentage of said maximum black value, without regard to the current derivative histogram value associated with said current luminance position, and wherein when searching for said plurality of white peaks, said negative derivative count is incremented if said current luminance position is less than said white luminance and said current luminance histogram value is less than a predefined percentage of said maximum white value, without regard to the current derivative histogram value associated with said current luminance position.

22. The imaging apparatus of claim 14, further comprising said controller being configured to execute instructions for:
designating a primary black peak from said plurality of black peaks; and
designating a primary white peak from said plurality of white peaks, wherein said luminance scaling of said image is performed between said primary black peak and said primary white peak.

23. An imaging apparatus configured for enhancing an image for printing, comprising:
a print engine configured to mount a cartridge: and
a controller communicatively coupled to said print engine, said controller being configured to execute instructions for:
generating a luminance histogram for said image;
generating a derivative histogram by taking derivative of said luminance histogram;
searching for a plurality of black peaks and searching for a plurality of white peaks using said derivative histogram; and
performing luminance scaling of said image between one black peak of said plurality of black peaks and one white peak of said plurality of white peaks; further comprising said controller being configured to execute instructions for:
designating a primary black peak from said plurality of black peaks; and
designating a primary white peak from said plurality of white peaks, wherein said luminance scaling of said image is performed between said primary black peak and said primary white peak; wherein said plurality of black peaks and said plurality of white peaks are distributed along a luminance scale, said plurality of black peaks including at least a proximal black peak and a distal black peak having a higher luminance on said luminance scale than said proximal black peak, said plurality of white peaks including at least a proximal white peak and a distal white peak having a lower luminance on said luminance scale than said proximal white peak, further comprising said controller being configured to execute instructions for: defining said primary black peak as being said distal black peak unless said proximal black peak is greater than a predefined percentage of said distal black peak, otherwise defining said primary black peak as being said proximal black peak; and
defining said primary white peak as being said distal white peak unless said proximal white peak is greater than a predefined percentage of said distal white peak, otherwise defining said primary white peak as being said proximal white peak.

24. The imaging apparatus of claim 22, wherein said plurality of black peaks and said plurality of white peaks are distributed along a luminance scale, said plurality of black peaks including at least a proximal black peak and a distal black peak having a higher luminance on said luminance scale than said proximal black peak, said plurality of white peaks including at least a proximal white peak and a distal white peak having a lower luminance on said luminance scale than said proximal white peak, further comprising said controller being configured to execute instructions for:
designating as an initial primary black peak one of said proximal black peak and said distal black peak;
designating as an initial primary white peak one of said proximal white peak and said distal white peak;
determining a percentage of said image that is located between said initial primary black peak and said initial primary white peak;
determining a middle tone histogram value;
determining a total image count based on said luminance histogram;
defining said primary black peak as being said initial primary black peak if said initial primary black peak is less than a first predefined percentage of said middle tone histogram value and said percentage of said image that is located between said initial primary black peak and said initial primary white peak is greater than a first predefined percentage of said total image count, otherwise defining said primary black peak as being said proximal black peak; and
defining said primary white peak as being said initial primary white peak if said initial primary white peak is less than a second predefined percentage of said middle tone histogram value and said percentage of said image that is located between said initial primary black peak and said initial primary white peak is greater than a second predefined percentage of said total image count, otherwise defining said primary white peak as being said proximal white peak.

25. The imaging apparatus of claim 14, wherein said searching for said plurality of black peaks is performed in a direction of increasing luminance, and wherein said searching for said plurality of white peaks is performed in a direction of decreasing luminance.

26. The imaging apparatus of claim 14, further comprising said controller being configured to execute instructions for determining at least one of a brightness adjustment and a contrast adjustment for said image based on comparing a total black count from said luminance histogram with a total white count of said luminance histogram.

27. An imaging apparatus configured for enhancing an image for printing, comprising:
a print engine configured to mount a cartridge; and
a controller communicatively coupled to said print engine, said controller being configured to execute instructions for:
generating a luminance histogram for said image;
generating a derivative histogram by taking a first derivative of said luminance histogram;
searching for a plurality of black peaks and searching for a plurality of white peaks using said derivative histogram, wherein a different search parameter is used for said searching for said plurality of black peaks than is used for said searching for said plurality of white peaks;
designating a primary black peak from said plurality of black peaks;
designating a primary white peak from said plurality of white peaks, wherein said luminance scaling of said image is performed between said primary black peak and said primary white peak and wherein said plurality of black peaks and said plurality of white peaks are distributed along a luminance scale, said plurality of black peaks including at least a proximal black peak and a distal black peak having a higher luminance on said luminance scale than said proximal black peak, said plurality of white peaks including at least a proximal white peak and a distal white peak having a lower luminance on said luminance scale than said proximal white peak;

designating as an initial primary black peak one of said proximal black peak and said distal black peak;

designating as an initial primary white peak one of said proximal white peak and said distal white peak;

determining a percentage of said image that is located between said initial primary black peak and said initial primary white peak;

determining a middle tone histogram value;

determining a total image count based on said luminance histogram;

defining said primary black peak as being said initial primary black peak if said initial primary black peak is less than a first predefined percentage of said middle tone histogram value and said percentage of said image that is located between said initial primary black peak and said initial primary white peak is greater than a first predefined percentage of said total image count, otherwise defining said primary black peak as being said proximal black peak; and defining said primary white peak as being said initial primary white peak if said initial primary white peak is less than a second predefined percentage of said middle tone histogram value and said percentage of said image that is located between said initial primary black peak and said initial primary white peak is greater than a second predefined percentage of said total image count, otherwise defining said primary white peak as being said proximal white peak.

28. The imaging apparatus of claim 14, further comprising said controller being configured to execute instructions for determining at least one of a brightness adjustment and a contrast adjustment for said image based on comparing a total black count from said luminance histogram with an amount left over after removing the total black count and a total white count of said luminance histogram.

29. The imaging apparatus of claim 14, further comprising said controller being configured to execute instructions for determining at least one of a brightness adjustment and a contrast adjustment for said image based on comparing a total white count from said luminance histogram with an amount left over after removing a total black count and the total white count of said luminance histogram.

* * * * *